United States Patent
Kani et al.

(10) Patent No.: US 7,127,168 B2
(45) Date of Patent: Oct. 24, 2006

(54) MULTI-WAVELENGTH OPTICAL MODULATION CIRCUIT AND WAVELENGTH-DIVISION MULTIPLEXED OPTICAL SIGNAL TRANSMITTER

(75) Inventors: Jun-ichi Kani, Yokohama (JP); Katsuhiro Araya, Yokohama (JP); Noboru Takachio, Yokosuka (JP); Koji Akimoto, Yokosuka (JP); Mitsuhiro Teshima, Yokosuka (JP); Masamichi Fujiwara, Yokosuka (JP); Hiroo Suzuki, Yokohama (JP); Shingo Kawai, Yokosuka (JP); Katsumi Iwatsuki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 778 days.

(21) Appl. No.: 10/163,849

(22) Filed: Jun. 5, 2002

(65) Prior Publication Data

US 2002/0191904 A1    Dec. 19, 2002

(30) Foreign Application Priority Data

| Jun. 13, 2001 | (JP) | ............................. 2001-179167 |
| Jun. 13, 2001 | (JP) | ............................. 2001-179168 |
| Dec. 19, 2001 | (JP) | ............................. 2001-385798 |

(51) Int. Cl.
    *H04B 10/00*    (2006.01)
(52) U.S. Cl. .......................................... 398/79; 398/82
(58) Field of Classification Search .............. 398/79–88
    See application file for complete search history.

(56) References Cited

U.S. PATENT DOCUMENTS 5,566,381 A    10/1996 Korotky
(Continued)

FOREIGN PATENT DOCUMENTS

CA    2270053 A1    3/1999
(Continued)

OTHER PUBLICATIONS

M. Fujiwara et al., "Flattened optical multicarrier generation of 12.5 GHz spaced 256 channels based on sinusoidal amplitude and phase hybrid modulation", IEE Electronics Letters, vol. 37, No. 15, pp. 967-968, Jul. 19, 2001.
(Continued)

*Primary Examiner*—Agustin Bello
(74) *Attorney, Agent, or Firm*—Darby & Darby

(57) ABSTRACT

Multi-wavelength light having a frequency band equal to or greater than the FSR of an AWG is demultiplexed into individual wavelength channels, and power level deviations between wavelength channels are suppressed. An optical demultiplexer includes a wavelength-group demultiplexer that demultiplexes multi-wavelength light into wavelength groups formed from wavelength channels, and channel demultiplexers that demultiplex each wavelength group into wavelength channels light. An optical multiplexer includes channel multiplexers that multiplex modulated signal light of each wavelength channel for each wavelength group, and a wavelength-group multiplexer that multiplexes, for each wavelength group, WDM signal light output from the channel multiplexers. The FSR of the wavelength-group multiplexer/demultiplexer is set to be equal to or greater than the frequency band of the multi-wavelength light. The channel multiplexer/demultiplexer is an AWG in which the FSR is approximately the full width at half maximum of the transmission characteristics of each port of the wavelength-group multiplexer/demultiplexer.

32 Claims, 30 Drawing Sheets

U.S. PATENT DOCUMENTS

| | | | |
|---|---|---|---|
| 5,568,575 | A | 10/1996 | Sato |
| 5,631,758 | A | 5/1997 | Knox et al. |
| 5,923,683 | A * | 7/1999 | Morioka et al. ............... 372/6 |
| 6,081,355 | A | 6/2000 | Sharma et al. |
| 6,459,519 | B1 | 10/2002 | Sasai et al. |
| 6,831,774 | B1 * | 12/2004 | Fujiwara et al. ............ 359/326 |
| 6,847,786 | B1 * | 1/2005 | Wong et al. .................. 398/65 |

FOREIGN PATENT DOCUMENTS

| | | |
|---|---|---|
| CA | 2333713 A1 | 12/1999 |
| EP | 1 043 859 A2 | 10/2000 |
| JP | 55-154844 | 12/1980 |
| JP | 57-015543 A1 | 1/1982 |
| JP | 01-099337 A1 | 4/1989 |
| JP | 5-221259 | 9/1993 |
| JP | 7-37200 | 2/1995 |
| JP | 07-079212 | 3/1995 |
| JP | 07-154325 | 6/1995 |
| JP | 08-234250 | 9/1996 |
| JP | 08-313852 | 11/1996 |
| JP | 09-083490 | 3/1997 |
| JP | 09-172429 | 6/1997 |
| JP | 09-233052 | 9/1997 |
| JP | 09-244076 | 9/1997 |
| JP | 09-247098 | 9/1997 |
| JP | 09-261175 | 10/1997 |
| JP | 10-013357 | 1/1998 |
| JP | 10-206919 | 8/1998 |
| JP | 10-260332 | 9/1998 |
| JP | 11-82036 | 3/1999 |
| JP | 11-103288 | 4/1999 |
| JP | 2000-224108 | 8/2000 |
| JP | 2000-277849 | 10/2000 |
| JP | 2000-295201 | 10/2000 |
| JP | 2000-298297 | 10/2000 |
| JP | 2001-004860 | 1/2001 |
| JP | 2002-082323 | 3/2002 |

OTHER PUBLICATIONS

N. Takachio et al., "Wide area gigabit access network based on 12.5 GHz spaced 256 channel super-dense WDM technologies", IEE Electronics Letters, vol. 37, No. 5, pp. 309-311, Mar. 1, 2001.

Jung-Hee Han et al., "4×2.5 Gbit/s transmission of spectrum-sliced incoherent light channels using an all-optical bandwidth expansion technique", in proceeding of European Conference on Optical Communications, pp. 345-346, Sep. 20-24, 1998.

Noboru Takachio et al., "12.5-GHz-spaced super-dense WDM ring network handling 256 wavelengths with tapped-type OADMs", in proceedings of Optical Fiber Communication Conference, Anaheim, pp. 349-350, Mar. 17-22, 2002.

Hiroaki Sanjoh et al., "Multiwavelength Light Source with Precise Frequency Spacing Using a Mode-Locked Semiconductor Laser and an Arrayed Waveguide Grating Filter", IEEE Photonics Technology Letters, vol. 9, No. 6, pp. 818-820, Jun. 1997.

J.J. Veselka et al., "A Multiwavelength Source Having Precise Channel Spacing for WDM Systems", IEEE Photonics Technology Letters, vol. 10, No. 7, Jul. 1998, pp. 958-960.

X. Steve Yao, "Phase-to-Amplitude Modulation Conversion Using Billouin Selective Sideband Amplification", IEEE Photonics Technology Letters, vol. 10, No. 2, Feb. 1998, pp. 264-266.

Eric A. Swanson et al., "23-GHz and 123-GHz Soliton Pulse Generation Using Two CW Lasers and Standard Single-Mode Fiber", IEEE Photonics Technology Letters, vol. 6, No. 7, Jul. 1994, pp. 796-798.

Mitsuhiro Teshima et al., "Optical carrier supply module applicable to over 100 super-dense WDM systems of 1000 channels", Proc. 27th Eur. Conf. on Opt. Comm. (ECOC 01), No. L. 3.7., vol. 1, Sep. 30, 2001, pp. 98-99.

Takachio N. et al., Wide area gigabit access network based on 12.5 GHz spaced 256 channel super-dense WDM technologies, Electronics Letters, IEE Stevenage, GB, vol. 37, No. 5, Mar. 1, 2001, pp. 309-311.

* cited by examiner

MULTI-WAVELENGTH OPTICAL MODULATION CIRCUIT AND WAVELENGTH-DIVISION MULTIPLEXED OPTICAL SIGNAL TRANSMITTER

BACKGROUND OF THE INVENTION

1. Field of the Invention

The present invention relates to a multi-wavelength optical modulation circuit that demultiplexes multi-wavelength light, modulates the light of each wavelength channel using a plurality of optical modulators, performs wavelength division multiplexing on the modulated signal light, and then transmits it, and also relates to a wavelength-division multiplexed optical signal transmitter that uses this multi-wavelength optical modulation circuit. In particular, the present invention relates to a multi-wavelength optical modulation circuit and wavelength-division multiplexed optical signal transmitter that can demultiplex wideband multi-wavelength light output from a multi-wavelength generation light source into individual wavelength channels. In addition, the present invention relates to a multi-wavelength optical modulation circuit and wavelength-division multiplexed optical signal transmitter that can suppress power level deviations between each wavelength channel.

2. Description of the Related Art

In order to meet the demands in recent years for increased transmission capacity, the development of wavelength-division multiplexing (WDM) transmission systems in which a plurality of optical signals having different wavelengths are transmitted on a single optical fiber transmission path has been making progress. Recently a WDM transmission system in which the number of multiplexes has increased to several hundred channels has been reported, while WDM transmission systems having 160 channels are already being manufactured at the business use level.

FIG. 30 shows an example of the structure of a conventional wavelength-division multiplexed optical signal transmitter provided with a multi-wavelength optical modulation circuit. The structure in this drawing is disclosed in, for example, a paper by N. Takachio et al. entitled "Wide area gigabit access network based on 12.5 GHz spaced 256 channel super-dense WDM technologies" in IEE Electronics Letters, Vol. 37, pp. 309–310, Mar. 1, 2001. In this drawing the wavelength-division multiplexed optical signal transmitter generates light in a plurality of wavelength channels by filtering (spectrum slicing) multi-wavelength light output from a multi-wavelength generation light source 981 using an optical demultiplexer 982. The light of each wavelength channel is then modulated respectively by a plurality of optical modulators 983-1 to 983-n, and the modulated signal light then undergoes wavelength-division multiplexing using an optical multiplexer 984 and is transmitted. Multi-wavelength light includes a plurality of different wavelength components and the wavelength components can be separated into each wavelength component with each of these being able to be used as an optical carrier for a different signal. Multi-wavelength light is obtained by modulating the phase of laser light using a single frequency. Note that it is also possible to obtain multi-wavelength light using a mode-locking scheme (see a paper by H. Sanjoh et al. entitled "Multiwavelength Light Source with Precise Frequency Spacing Using a Mode-Locked Semiconductor Laser and an Arrayed Waveguide Grating Filter", IEEE Photonics technology letters, VOL. 9, No. 6, June, 1997). It is also possible to obtain super multi-wavelength light (super continuum light) by causing a non-linear effect in pulse light. A light source that generates multi-wavelength light efficiently from one or a plurality of seed laser diodes in the manners described above is known as a multi-wavelength generation light source. In a conventional wavelength-division multiplexed optical signal transmitter an arrayed waveguide grating (AWG) filter is used as the optical demultiplexer 982 and the optical multiplexer 984. However, an AWG has a cyclic transmission characteristic in that all wavelengths with the space of free spectral range (FSR) are transmitted. Therefore, when an AWG for channel demultiplexing that has the same channel spacing as the multi-wavelength light demultiplexes wideband multi-wavelength light having multiplicity in which, for example, the wavelength number is 1000 channels or more, as is shown in FIG. 31, the frequency band of the multi-wavelength light exceeds the FSR of the AWG resulting in a plurality of wavelengths being output from a single output port. Namely, in this type of AWG for channel demultiplexing it is not possible to demultiplex multi-wavelength light having a frequency band equal to or wider than the FSR into individual wavelength channels.

Moreover, examples of the multi-wavelength generation light source 981 include those that use amplified spontaneous emission light (ASE light) output from an optical fiber amplifier, and those that use repetitive short optical pulses.

When repetitive short optical pulses are used, as is shown in FIG. 32, the problem arises that a power level deviation is generated between each of the wavelength channels obtained by the spectrum slicing. If the power is not uniform for each wavelength, the cross-talk effect generated by the high powered wavelengths to the low powered wavelengths increases and excessive degradation may occur. Moreover, if the total power is decreased so that high powered wavelengths do not cause degradation due to the nonlinear effect, noise in the low powered wavelengths increases.

SUMMARY OF THE INVENTION

It is an object of the present invention to enable multi-wavelength light having a frequency band equal to or wider than the FSR of an AWG to be demultiplexed into individual wavelength channels in a multi-wavelength optical modulation circuit and wavelength-division multiplexed optical signal transmitter that use a multi-wavelength generation light source to generate multi-wavelength light, demultiplex this multi-wavelength light, modulate the light of each resulting wavelength channel using a plurality of optical modulators, perform wavelength division multiplexing on the modulated signal light, and then output it. In addition to this, it is an object of the present invention to provide a multi-wavelength optical modulation circuit and wavelength-division multiplexed optical signal transmitter that can suppress power level deviations between each wavelength channel.

In order to achieve the above objects, the multi-wavelength optical modulation circuit of the present invention comprises: a wavelength-group demultiplexer that receives multi-wavelength light having a plurality of wavelengths and demultiplexes the multi-wavelength light into wavelength groups formed from the respective plurality of wavelengths; a plurality of channel demultiplexers that demultiplex each wavelength group into light of the respective wavelengths; a plurality of optical modulators that modulates the light of respective wavelengths demultiplexed by the channel demultiplexers with transmission signals; a plurality of channel multiplexers that multiplex the modulated signal light of each wavelength output from the optical modulators for each wavelength group; and a wavelength-group multiplexer that multiplexes the wavelength-division multiplexed signal light of each wavelength group output from each channel multiplexer.

Furthermore, the wavelength-division multiplexed optical signal transmitter of the present invention comprises: a multi-wavelength generation light source that generates multi-wavelength light having a plurality of wavelengths; and a multi-wavelength optical modulation circuit, wherein the multi-wavelength optical modulation circuit is provided with: a wavelength-group demultiplexer that receives the multi-wavelength light to demultiplex the multi-wavelength light into wavelength groups formed from the respective plurality of wavelengths; a plurality of channel demultiplexers that demultiplex each wavelength group into light of the respective wavelengths; a plurality of optical modulators that modulates the light of each wavelength demultiplexed by the channel demultiplexers with transmission signals; a plurality of channel multiplexers that multiplex the modulated signal light of each wavelength output from the plurality of optical modulators for each wavelength group; and a wavelength-group multiplexer that multiplexes the wavelength-division multiplexed signal light of each wavelength group output from each channel multiplexer.

According to the present invention, it is possible to demultiplex multi-wavelength light having a frequency band equal to or greater than the FSR of an AWG into individual wavelength channels, by providing a wavelength-group multiplexer/demultiplexer and a channel multiplexer/demultiplexer in a multi-wavelength optical modulation circuit and wavelength-division multiplexed optical signal transmitter that use a multi-wavelength generation light source to generate multi-wavelength light, demultiplex the multi-wavelength light, modulate the light of each resulting wavelength channel using a plurality of optical modulators, perform wavelength division multiplexing on the modulated signal light, and then output the multiplexed light. Moreover, by matching the frequency spacing of the seed lasers (e.g., semiconductor lasers) forming the multi-wavelength generation light source with the FSR of the AWG forming the channel multiplexer/demultiplexers, it is possible to apply AWGs having the same characteristics to different wavelength groups using the cyclic nature of AWG in which respective FSRs have the same transmission characteristics. Accordingly, there is no need to perform multi-product low volume production of the AWG that form the channel multiplexer/demultiplexers. In addition, it is possible to suppress power level deviations between wavelength channels that may be generated in the multi-wavelength generation light source.

DETAILED DESCRIPTION OF THE PREFERRED EMBODIMENTS

[First Embodiment]

Figure 1:
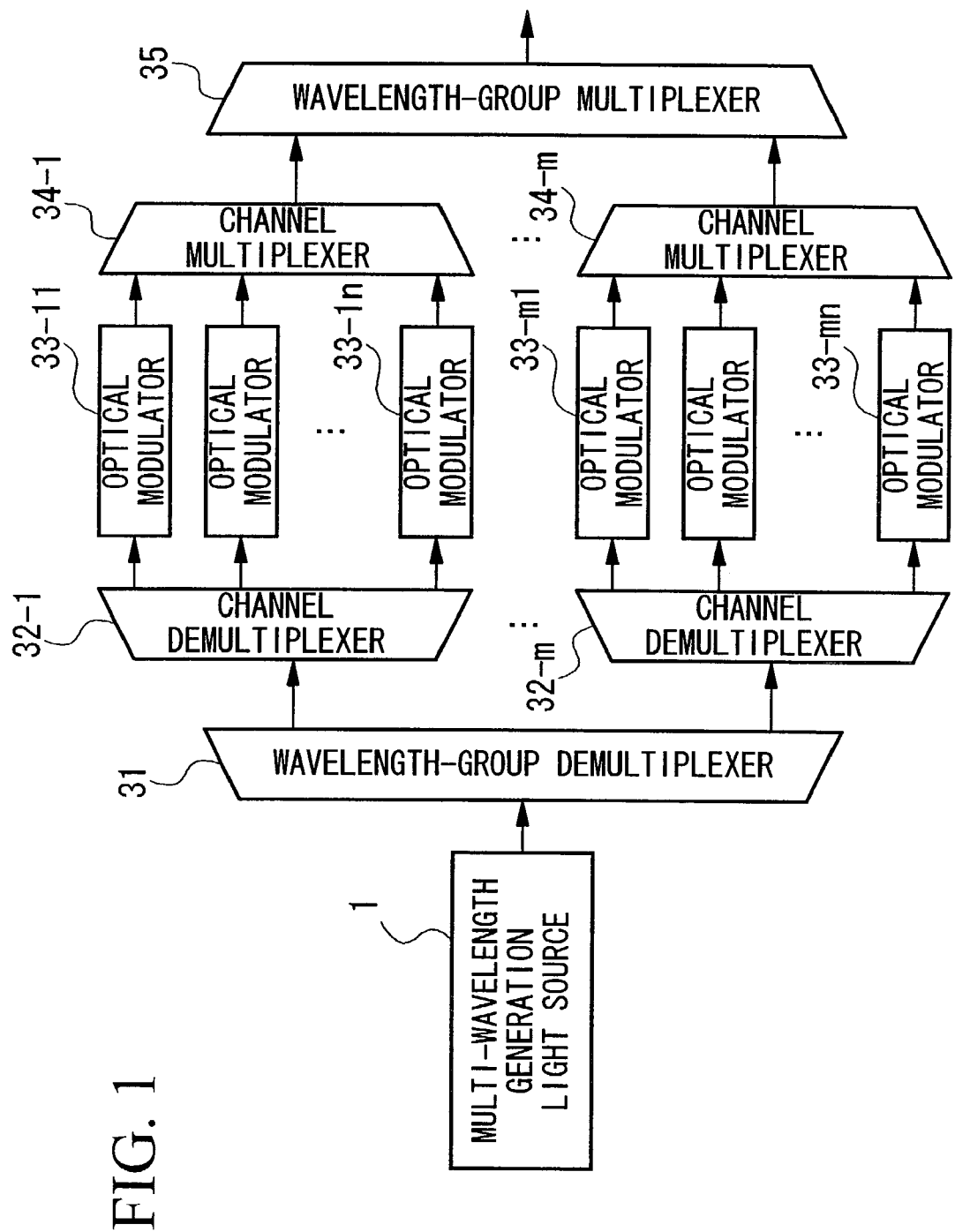
FIG. 1 is a block diagram showing the structure of the wavelength-division multiplexed optical signal transmitter according to a first embodiment of the present invention.

FIG. 1 shows the wavelength-division multiplexed optical signal transmitter according to a first embodiment of the present invention.

In FIG. 1 the wavelength-division multiplexed optical signal transmitter of the present embodiment is provided with a multi-wavelength generation light source 1 that generates multi-wavelength light having a plurality of wavelengths, a wavelength-group demultiplexer 31 that demultiplexes the multi-wavelength light into respective wavelength groups formed by a respective plurality of wavelength channels, channel demultiplexers 32-1 to 32-m that demultiplex each wavelength group respectively into the plurality of wavelength channels, a plurality of optical modulators 33-11 to 33-mn that modulate the light of each wavelength channel respectively using transmission signals, channel multiplexers 34-1 to 34-m that respectively multiplex the modulation signal light of each channel for each wavelength group, and a wavelength-group multiplexer 35 that multiplexes the wavelength-division multiplexed signal light of each wavelength group output from each of the channel multiplexers. Components other than the multi-wavelength generation light source 1 form a multi-wavelength optical modulation circuit.

The wavelength-group demultiplexer 31 and the wavelength-group multiplexer 35, and the channel demultiplexers 32 and the channel multiplexers 34 form pairs each having the same transmission characteristics, and may be formed, for example, by an arrayed waveguide grating (AWG) filter. The wavelength-group demultiplexer 31 and the wavelength-group multiplexer 35 may also be formed by dielectric multilayer filters, fiber gratings or the like in addition to the AWG. In the following description the transmission characteristics of the wavelength-group demultiplexer 31 and the channel demultiplexers 32 are shown, however, the same description applies to the wavelength-group multiplexer 35 and the channel multiplexers 34.

Figure 2:
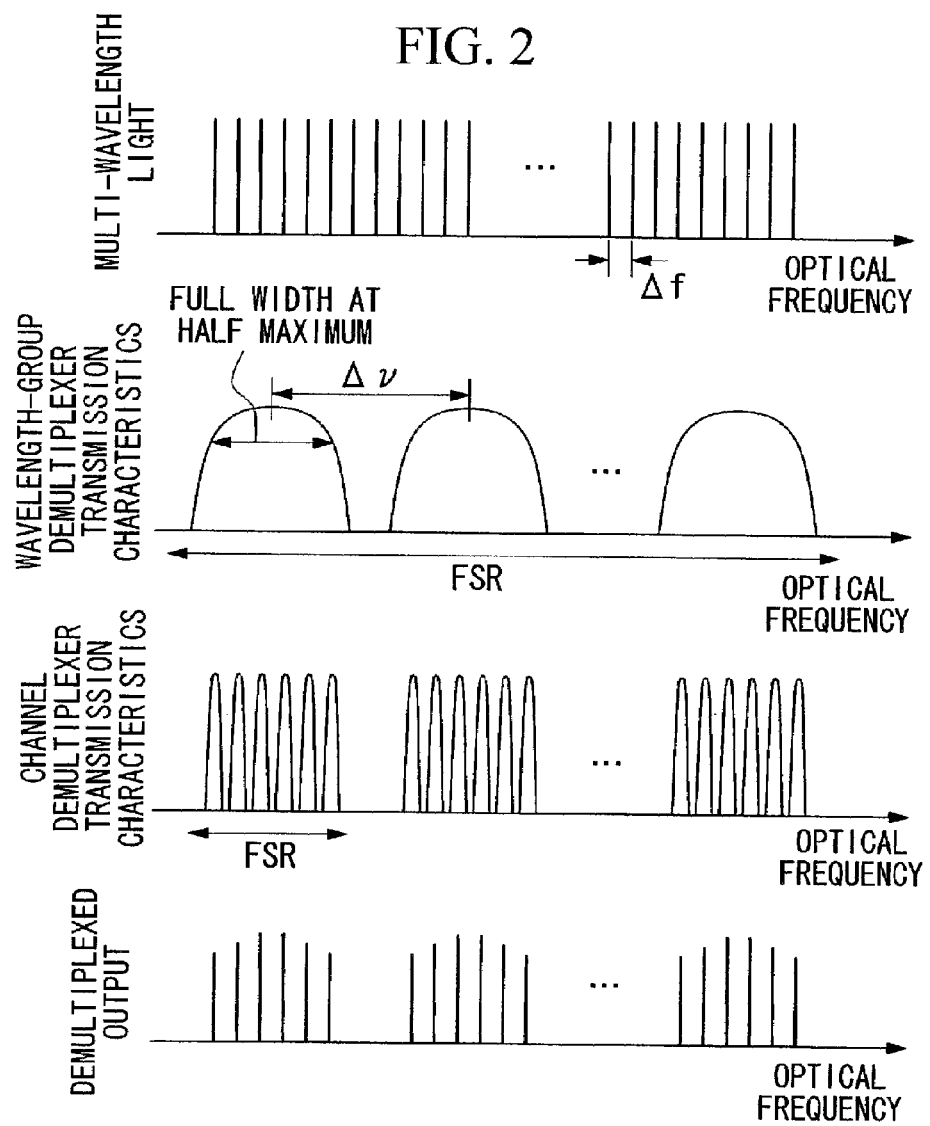
FIG. 2 is a diagram showing transmission characteristics of a wavelength-group demultiplexer 31 and a channel demultiplexer 32.

FIG. 2 shows the transmission characteristics of the wavelength-group demultiplexer 31 and the channel demultiplexers 32. The frequency spacing between adjacent channels (hereinafter referred to as "channel frequency spacing") of multi-wavelength light output from the multi-wavelength generation light source 1 is set to $\Delta f$. The FSR of the wavelength-group demultiplexer 31 is set equal to or greater than the frequency band of the multi-wavelength light output from the multi-wavelength generation light source 1, while the full width at half maximum of the transmission characteristics of each port is set to approximately a multiple ($n \times \Delta f$) of the channel frequency spacing $\Delta f$, and the frequency spacing between adjacent transmission center frequencies (hereinafter referred to as "transmission center frequency spacing") $\Delta v$ is set such that $\Delta v \geq n \times \Delta f$. The FSR of the channel demultiplexer 32 is set equal to or greater than the full width at half maximum of the transmission characteristics of each port of the wavelength-group demultiplexer 31, while the transmission center frequency spacing of each port is set to $\Delta f$. As a result wavelength-group demultiplexing and channel demultiplexing of multi-wavelength light become possible.

Figure 3:
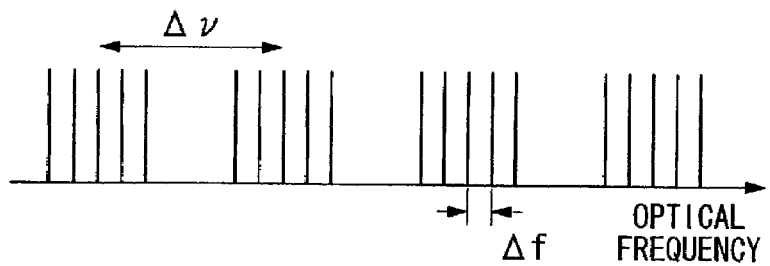
FIG. 3 is a diagram showing another example of an optical spectrum of multi-wavelength light.

In stead of outputting multi-wavelength light with each channel uniformly lined up at the channel frequency spacing $\Delta f$ (FIG. 2), as is shown in FIG. 3, the multi-wavelength generation light source 1 may output multi-wavelength light in which a plurality of wavelength sets are distributed in the frequency domain, and each wavelength set formed from n number of channels lined up at the channel frequency spacing $\Delta f$ has the center frequency spacing of $\Delta v$ and satisfies the relationship $\Delta v \geq n \times \Delta f$. In this case, the transmission center frequency difference between output (or input) ports that are adjacent on the wavelength domain of the wavelength-group demultiplexer (or wavelength-group multiplexer) is set to p (wherein p is an arbitrary natural number) times the center frequency difference of each wavelength set of the multi-wavelength light. When p=1 each wavelength set of the multi-wavelength light matches each wavelength group demultiplexed (or multiplexed) by the wavelength-group demultiplexer (or multiplexer).

A description will now be given of the structure of the multi-wavelength generation light source 1 that generates multi-wavelength light such as that shown in FIG. 3 and of the transmission characteristics of the wavelength-group demultiplexer, wavelength-group multiplexer, channel demultiplexer and channel multiplexer for suppressing power level deviations between channels. Note that in order to suppress power level deviations, for example, a scheme in which optical spectrum flattening is performed using a super continuum light source may be used, or a scheme in which optical spectrum flattening is performed using an optical filter having the opposite characteristics from the optical spectrum configuration output by the multi-wavelength generation light source. In the present embodiment, by providing the wavelength-group demultiplexer and wavelength-group multiplexer with transmission characteristics that have the opposite configuration from the optical spectrum of the multi-wavelength light output from the multi-wavelength generation light source, power level deviations between channels are suppressed.

<First Structural Example of the Multi-wavelength Generation Light Source 1>

Figure 4:
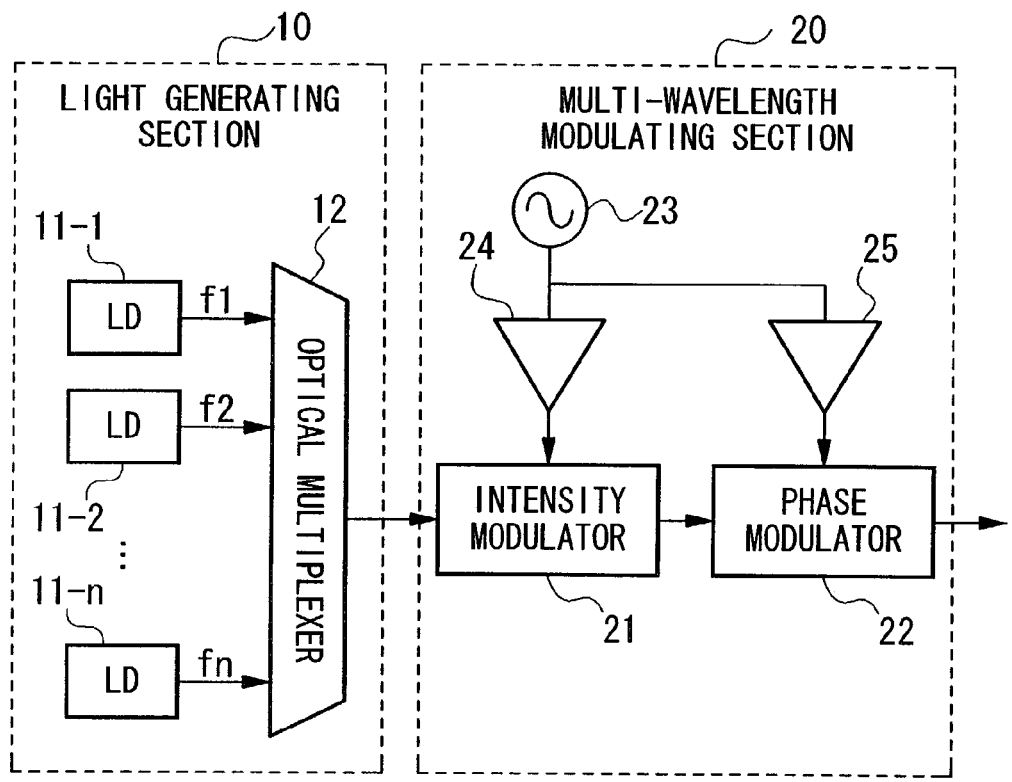
FIG. 4 is a block diagram showing a first structural example of a multi-wavelength generation light source 1.

FIG. 4 shows a first structural example of the multi-wavelength generation light source 1. This example is a multi-wavelength generation light source 1 (Japanese Patent Application No. 2001-199791) that generates multi-wavelength light by performing phase modulation and intensity modulation (amplitude modulation) using electrical signals (e.g., a sinusoidal wave) having a specific repetition cycle on continuous light having a plurality of center frequencies, and by generating sideband for each center frequency.

In FIG. 4 the multi-wavelength generation light source 1 is provided with a light generating section 10 and a multi-wavelength modulating section 20. The light generating section 10 is provided with n number of semiconductor lasers (LD) 11-1 to 11-n that generate continuous light having the respectively different center frequencies f1 to fn, and an optical multiplexer 12 that multiplexes the continuous light. The multi-wavelength modulating section 20 is provided with an intensity modulator 21 that modulates the intensity (i.e., modulates the amplitude) of light output from the light generating section 10 and a phase modulator 22 that modulates the phase of light output from the light modulating section 10 (the order of the respective modulators is optional and the intensity modulator 21 may also be positioned downstream from the phase modulator 22), a cyclic signal generator 23 that generates a predetermined cyclic signal (a sinusoidal wave) to be applied to each modulator, and voltage adjusting sections 24 and 25 that adjust the applied voltage and bias voltage of the cyclic signals. The multi-wavelength modulating section 20 may also use, for example, a Mach-Zehnder intensity modulator to perform phase modulation in a branched path and allow an overall intensity modulation (amplitude modulation) to be performed.

Figure 5:
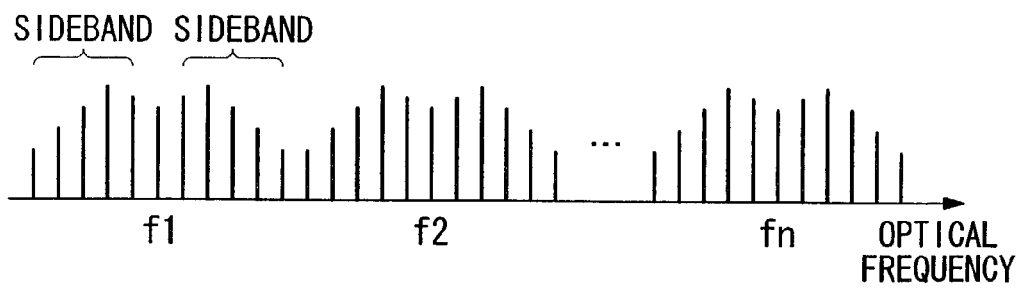
FIG. 5 is a diagram showing an output light spectrum of the first structural example of the multi-wavelength generation light source 1.

The intensity modulator 21 modulates the amplitude of the temporal waveform of the light (continuous light) output from the light generating section 10 using a fixed frequency corresponding to the desired wavelength spacing. As a result, an optical spectrum having the output frequency of the light generating section as the center frequency and sidebands of discrete wavelengths of the relevant frequency spacing is obtained as the output light of the intensity modulator 21. Furthermore, the phase modulator 22 modulates the phase of the modulated wave to deviate the discrete optical spectrum to the upper and lower sidebands in the frequency domain. Here, by adjusting the frequency deviation amount of each modulator and performing control such that the discrete optical spectra are superposed and the power level deviation of each sideband is made the same, an optical spectrum is obtained that has sidebands at an equal spacing relative to the respective center frequencies f1 to fn, such as is shown in FIG. 5. However, in the optical spectrum of this multi-wavelength light the center frequency power is lowered due to the effect of the phase modulation.

By using a wavelength-group demultiplexer and a wavelength-group multiplexer (31, 35) whose transmission characteristics are the Gaussian distribution, it is possible to suppress the power level deviations between channels for the multi-wavelength light having the above type of optical spectrum.

Figure 6:
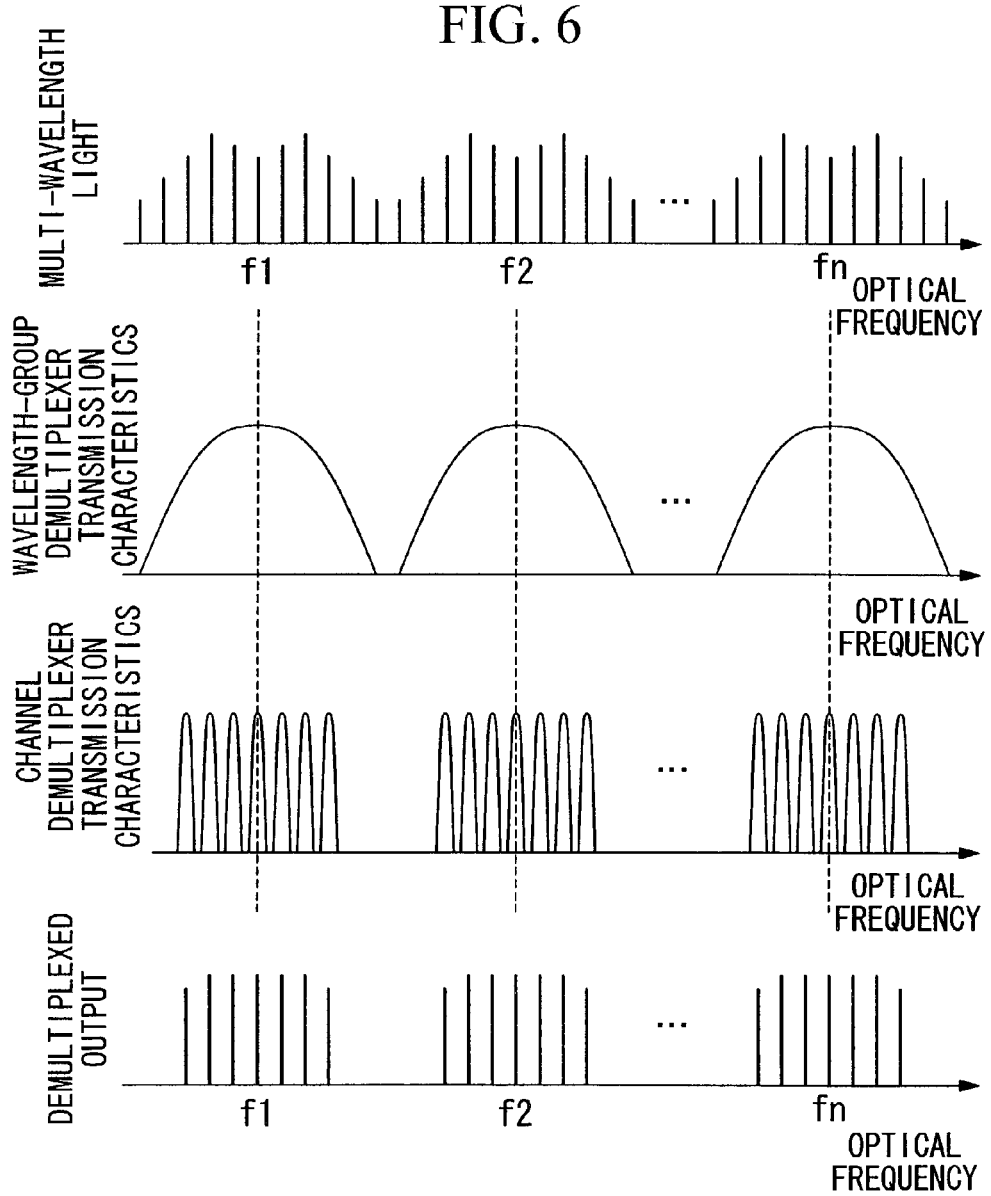
FIG. 6 is a diagram showing transmission characteristics of an optical demultiplexer corresponding to the first structural example of the multi-wavelength generation light source 1.

FIG. 6 shows the transmission characteristics of the wavelength-group demultiplexer 31 and the channel demultiplexer 32 corresponding to the first structural example of the multi-wavelength generation light source 1. As is shown in FIG. 6, by using a wavelength-group demultiplexer 31 whose transmission characteristics are the Gaussian distribution, and by matching the transmission center frequency thereof with the center frequencies f1 to fn of the wavelength sets of the multi-wavelength light, and by further using a channel demultiplexer 32 in which the transmission center frequency is set to the channel frequency spacing Δf, it is possible to perform demultiplexing into respective wavelength channels in which the power level deviation is suppressed.

<Second Structural Example of the Multi-wavelength Generation Light Source 1>

Figure 7:
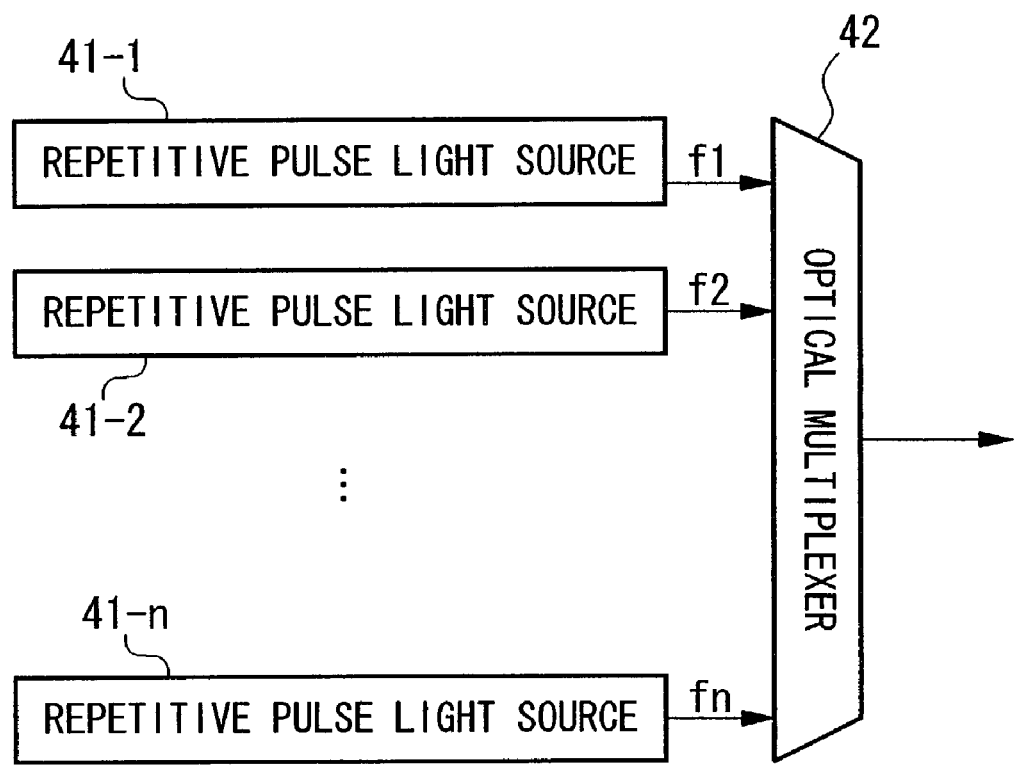
FIG. 7 is a diagram showing a second structural example of the multi-wavelength generation light source 1.

FIG. 7 shows a second structural example of the multi-wavelength generation light source 1.

In FIG. 7 the multi-wavelength generation light source 1 is provided with a plurality of repetitive pulse light sources 41-1 to 41-n that output repetitive short optical pulses each having a different center frequency, and an optical multiplexer 42 that multiplexes each of the repetitive short optical pulses.

Because the optical spectrum of the multi-wavelength light output from the multi-wavelength generation light source 1 closely resembles the Gaussian distribution, by using a wavelength-group demultiplexer and a wavelength-group multiplexer (31 and 35) whose transmission characteristics exhibit a notch of transmittance in the center of the transmission wavelength band it is possible to suppress power level deviations between channels.

Figure 8:
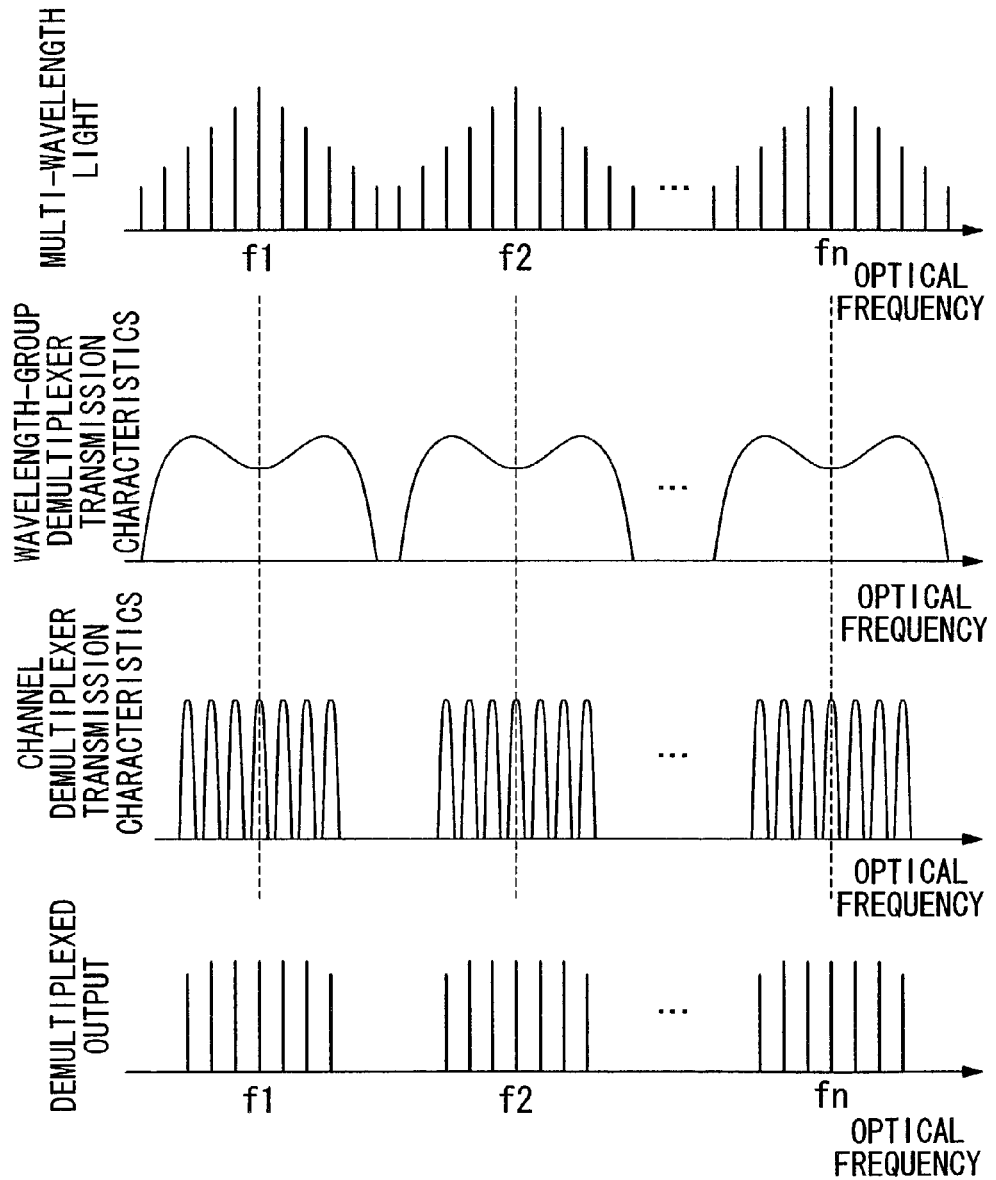
FIG. 8 is a diagram showing transmission characteristics of an optical demultiplexer corresponding to the second structural example of the multi-wavelength generation light source 1.

FIG. 8 shows the transmission characteristics of the wavelength-group demultiplexer 31 and the channel demultiplexer 32 corresponding to the second structural example of the multi-wavelength generation light source 1. As is shown in FIG. 8, by using a wavelength-group demultiplexer 31 whose transmission characteristics exhibit a notch of transmittance in the center of the transmission wavelength band on the Gaussian distribution of multi-wavelength light, and by matching the transmission center frequency thereof with the center frequencies f1 to fn of the wavelength sets of the multi-wavelength light, and by further using a channel demultiplexer 32 in which the transmission center frequency is set to the channel frequency spacing Δf, it is possible to perform demultiplexing into respective wavelength channels in which the power level deviation is suppressed.

Moreover, in the above described first embodiment, in order to suppress power level deviations it is not absolutely necessary that only the transmission characteristics of the wavelength-group demultiplexer be controlled, and it is also possible to perform control such that the total transmission characteristics of the wavelength-group demultiplexer and the wavelength-group multiplexer achieve the above described suppression of the power level deviation.

[Second Embodiment]

Figure 9:
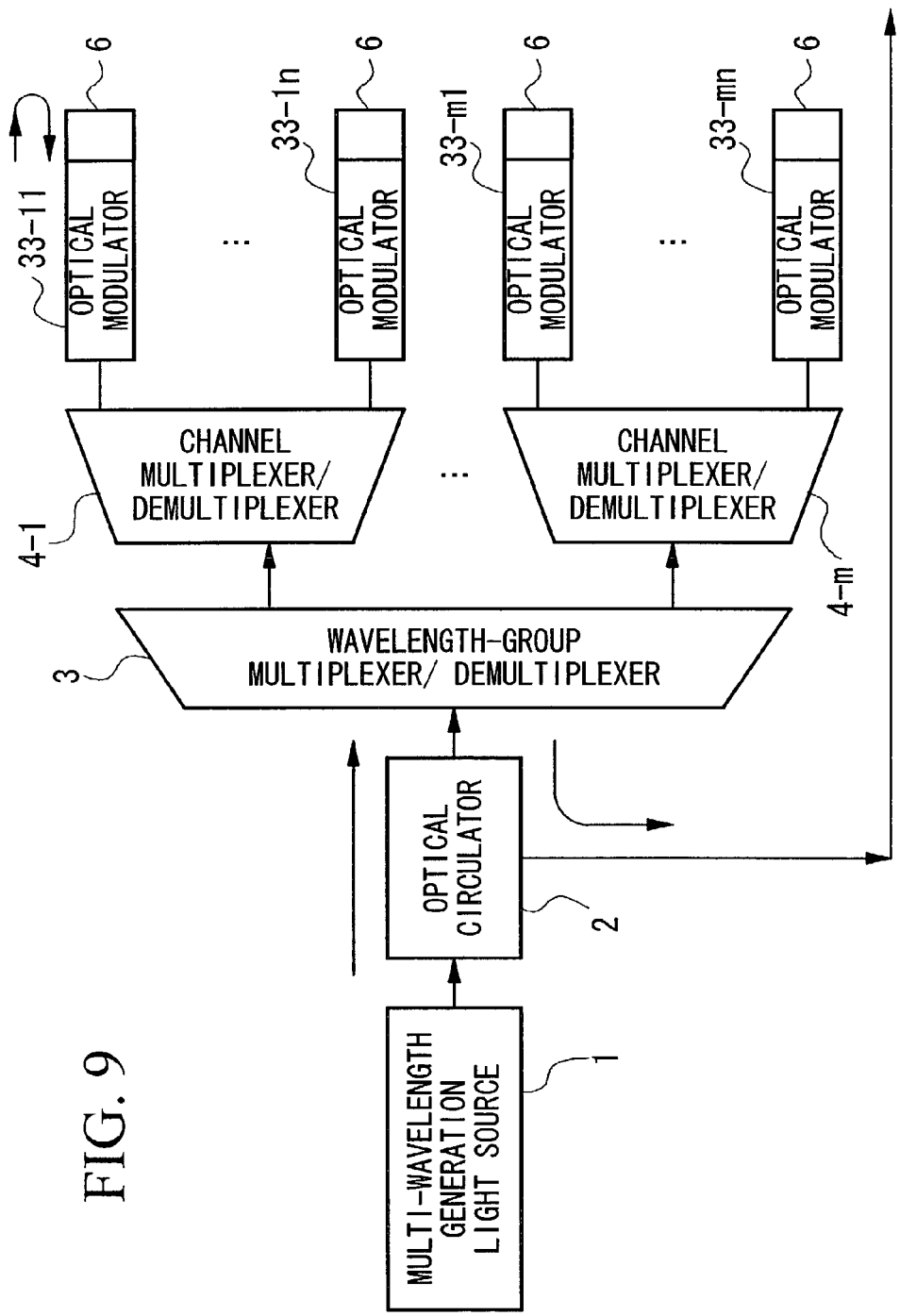
FIG. 9 is a block diagram showing the structure of the wavelength-division multiplexed optical signal transmitter according to a second embodiment of the present invention.

FIG. 9 is a block diagram showing the structure of the wavelength-division multiplexed optical signal transmitter according to the second embodiment of the present invention. Note that the same reference symbols are given to component elements that are the same as those shown in FIG. 1. The features of the present embodiment are the providing of light reflection device 6 that reflects the output of the optical modulators 33-11 to 33-mn; the uniting of the wavelength-group demultiplexer 31 and the wavelength-group multiplexer 35 as a wavelength-group multiplexer/demultiplexer 3; and the uniting of the channel demultiplexer 32 and the channel multiplexer 34 as a channel multiplexer/demultiplexer 4. Note that the output from the multi-wavelength generation light source 1 is connected to the wavelength-group multiplexer/demultiplexer 3, and an optical circulator 2 or an optical input/output device having the same functions as an optical circulator is used to extract the multiplexed output from the wavelength-group multiplexer/demultiplexer 3 as an output from the wavelength-division multiplexed optical signal transmitter.

In FIG. 9, the optical circulator 2 inputs multi-wavelength light output from the multi-wavelength light source 1 into the wavelength-group multiplexer/demultiplexer 3. The wavelength-group multiplexer/demultiplexer 3 demultiplexes the input multi-wavelength light into respective wavelength groups and inputs the wavelength groups into the channel multiplexer/demultiplexers 4-1 to 4-m. Each channel multiplexer/demultiplexer 4 demultiplexes each wavelength group into a plurality of optical carriers that have the same wavelength spacing. The optical modulators 33-11 to 33-mn modulate the optical carriers of corresponding wavelengths, and the light reflection device 6 reflects the respective modulated light. The channel multiplexer/demultiplexers 4-1 to 4-m multiplex the modulated signal light of respective channels for each wavelength group, and the wavelength-group multiplexer/demultiplexer 3 multiplexes the wavelength-division multiplexed signal light of each wavelength group. The optical circulator 2 transmits this multiplexed light along an optical transmission path.

A mirror coated with a metal film or a dielectric multilayer, or a diffraction grating or fiber Bragg grating, which is a device for reflecting a specific wavelength, or the like can be used as the light reflection device 6. Note also that in FIG. 9 the optical modulator 33 and the light reflection device 6 are in contact with each other, however, it is also possible to employ a structure in which these two are optically connected by an optical fiber or optical waveguide.

In the above embodiment, the total transmission characteristics of the wavelength-group demultiplexer and the wavelength-group multiplexer achieve the above-described suppression of the power level deviation.

[Third Embodiment]

In the first embodiment it was shown that power level deviations between channels can be suppressed by providing transmission characteristics of each output port of the wavelength-group multiplexer/demultiplexer that have the opposite configuration from the optical spectrum of the multi-wavelength light output from the multi-wavelength generation light source 1. The present embodiment suppresses power level deviations between channels independent of the transmission characteristics of the wavelength-group multiplexer/demultiplexer.

Figure 10:
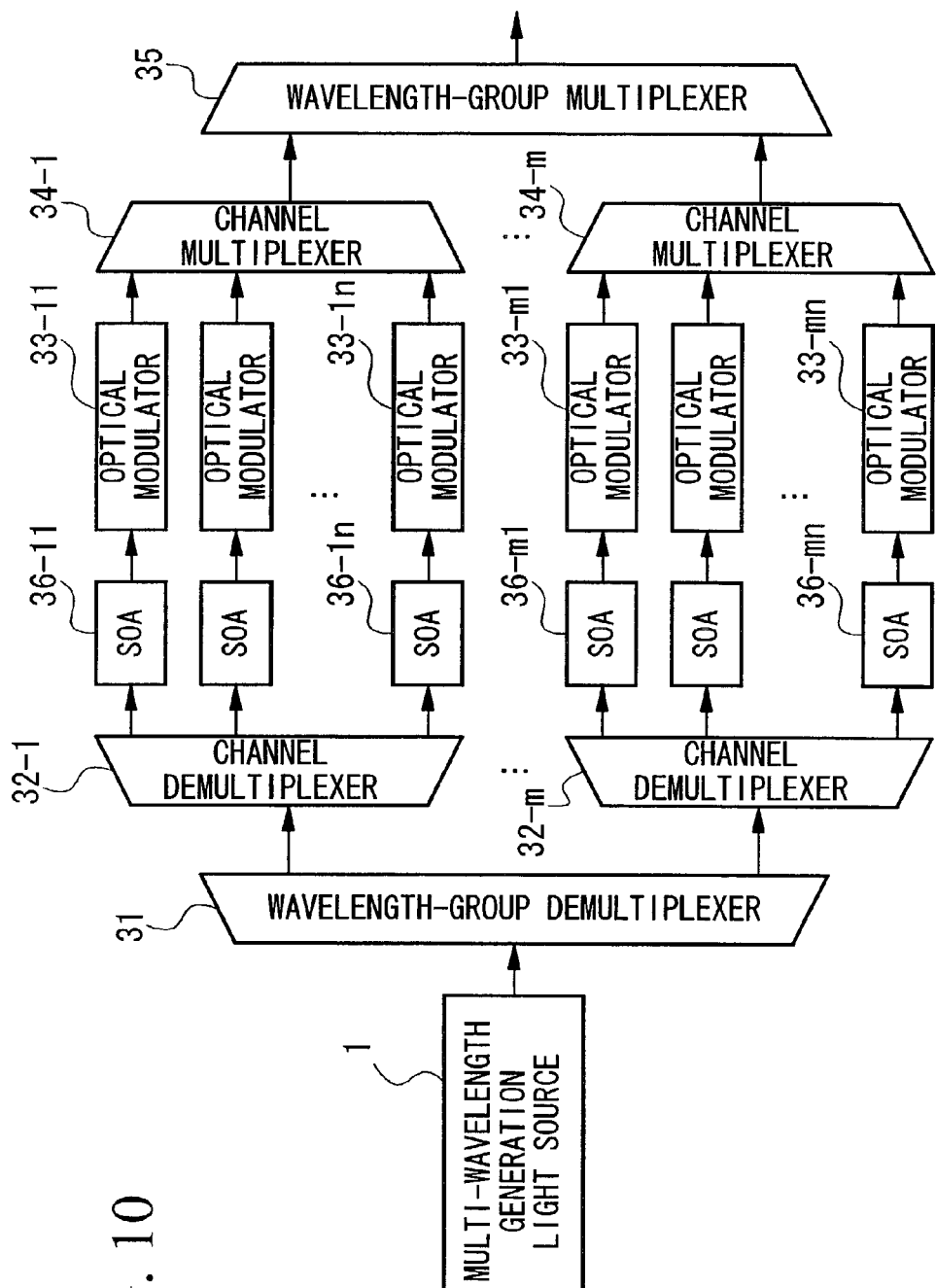
FIG. 10 is a block diagram showing the structure of the wavelength-division multiplexed optical signal transmitter according to a third embodiment of the present invention.

FIG. 10 shows the third embodiment of the wavelength-division multiplexed optical signal transmitter of the present invention.

In FIG. 10 the wavelength-division multiplexed optical signal transmitter of the present embodiment is provided with a multi-wavelength generation light source 1 that generates multi-wavelength light having a plurality of wavelengths, a wavelength-group demultiplexer 31 that demultiplexes the multi-wavelength light into respective wavelength groups formed by a respective plurality of wavelength channels, channel demultiplexers 32-1 to 32-m that demultiplex each wavelength group into the respective plurality of wavelength channels, semiconductor optical amplifiers (SOA) 36-11 to 36-mn that adjust the power level of the light of respective wavelength channels, a plurality of optical modulators 33-11 to 33-mn that modulate the light of respective wavelength channels using transmission signals, channel multiplexers 34-1 to 34-m that respectively multiplex the modulated signal light of respective wavelength channels for each wavelength group, and a wavelength-group multiplexer 35 that multiplexes the wavelength-division multiplexed signal light of each wavelength group output from each of the channel multiplexers. Component elements other than the multi-wavelength generation light source 1 form a multi-wavelength optical modulation circuit.

Note that the semiconductor optical amplifiers 36-11 to 36-mn may also be positioned downstream from the optical modulators 33-11 to 33-mn. In addition, it is possible to use semiconductor optical amplifiers or electroabsorption optical modulators as the optical modulators 33-11 to 33-mn.

In the present embodiment, light of each wavelength channel demultiplexed by the channel demultiplexer 32 is input into the semiconductor optical amplifier 36. By adjusting the bias current of the semiconductor optical amplifier 36 for controlling the gain, power level deviations between channels are suppressed. If the configuration of the optical spectrum of the multi-wavelength light output from the multi-wavelength generation light source 1 is known in advance then the gain control of each semiconductor optical amplifier can be performed in accordance with the optical spectrum, and power level deviations between channels can be suppressed. If, on the other hand, the configuration of the optical spectrum of the multi-wavelength light is not known in advance the power of each channel is detected using a monitor circuit (not shown) and the gain control of each semiconductor optical amplifier is performed in accordance with the detection result.

[Fourth Embodiment]

Figure 11:
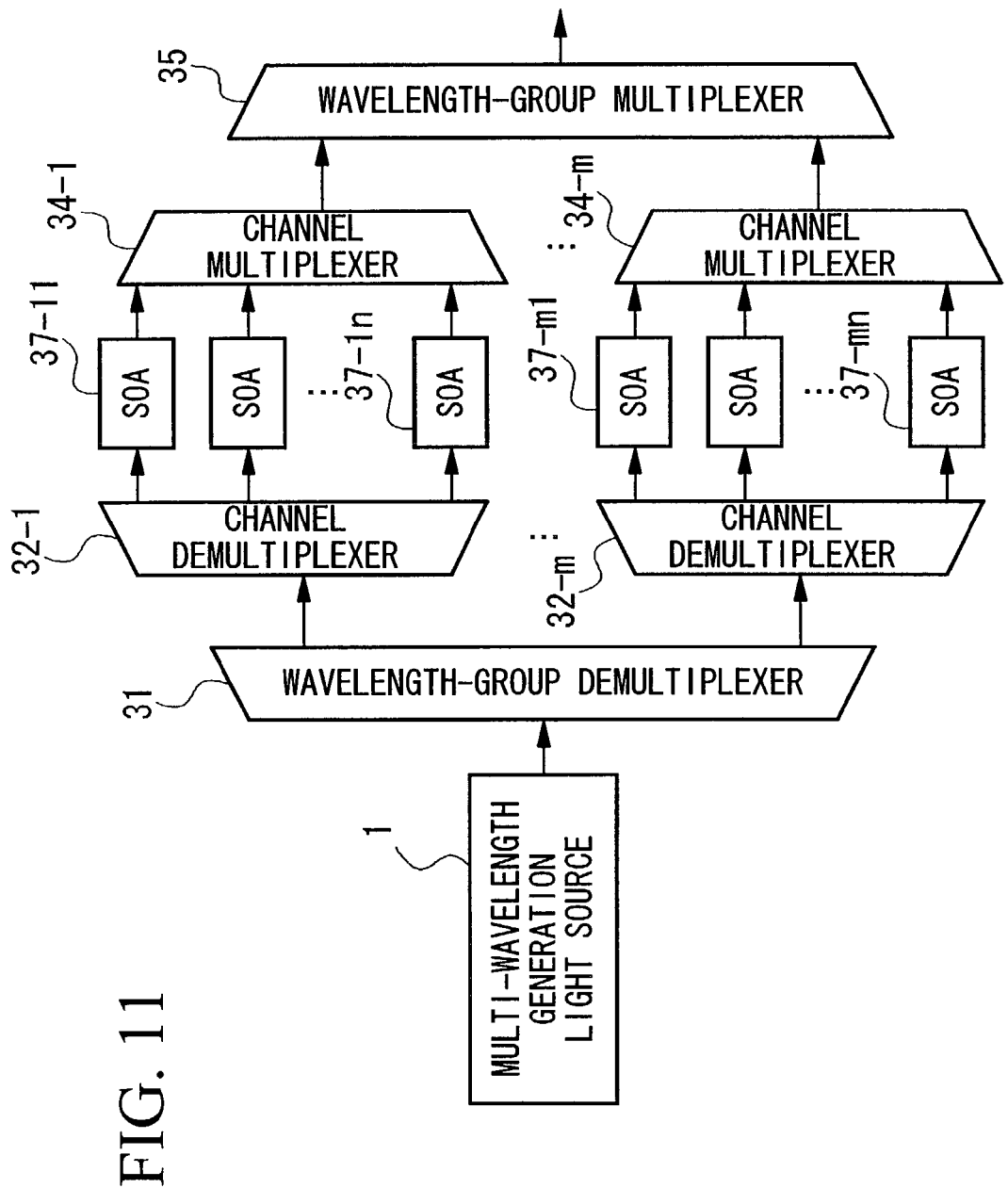
FIG. 11 is a block diagram showing the structure of the wavelength-division multiplexed optical signal transmitter according to a fourth embodiment of the present invention.

FIG. 11 shows the fourth embodiment of the wavelength-division multiplexed optical signal transmitter of the present invention.

The present embodiment is characterized in that the semiconductor optical amplifier 36 for controlling power levels and the optical modulator 33 used in the third embodiment are formed by a single semiconductor optical amplifier (SOA) 37. In addition, the present embodiment is characterized in that a transmission signal is applied to the semiconductor optical amplifier 37, and gain control is performed by adjusting the superposing bias current in the transmission signals. Power level deviation between channels can be suppressed using the above structure. Component elements other than the multi-wavelength generation light source 1 form a multi-wavelength optical modulation circuit.

As has been described above, according to the first to fourth embodiments, in a multi-wavelength optical modulation circuit and wavelength-division multiplexed optical signal transmitter that generate multi-wavelength light using a multi-wavelength generation light source, demultiplex this multi-wavelength light, modulate the light of each of the wavelength channels using a plurality of optical modulators, and perform wavelength-division multiplexing on the modulated signal light, by using a wavelength-group multiplexer/demultiplexer and a channel multiplexer/demultiplexer, it is possible to perform demultiplexing into individual wavelength channels for multi-wavelength light having a frequency band equal to or greater than the FSR of the AWG. In addition, since the frequency spacing of the seed lasers (e.g., semiconductor lasers) forming the multi-wavelength generation light source matches with the FSR of the AWG forming the channel multiplexer/demultiplexers, it is possible to apply AWG having the same characteristics to different wavelength groups using the cyclic nature of AWG in which respective FSRs have the same transmission characteristics. Accordingly, there is no need to perform multi-product low volume production of the AWG that form the channel multiplexer/demultiplexers.

Furthermore, by making the transmission characteristics of each output port of the wavelength-group multiplexer/demultiplexer opposite to the configuration of the optical spectrum of the multi-wavelength light, or by providing a device for adjusting the power levels of respective channels, even if the power of each wavelength of light output from the multi-wavelength generation light source is not uniform, it is possible to suppress power level deviations between wavelength channels and make the power uniform for each wavelength of the transmission optical signals. As a result, the cross-talk generated by a high power wavelength to a low power wavelength is lessened and excessive degradation can be prevented. In addition, because the need to reduce the overall power so that high power wavelengths do not degrade due to a non-linear effect no longer arises, noise in the low power wavelengths does not increase excessively.

The fifth to tenth embodiments described below are intended to increase the reliability of the multi-wavelength generation light source by using a redundant structure in the multi-wavelength generation light source.

[Fifth Embodiment]

Figure 12:
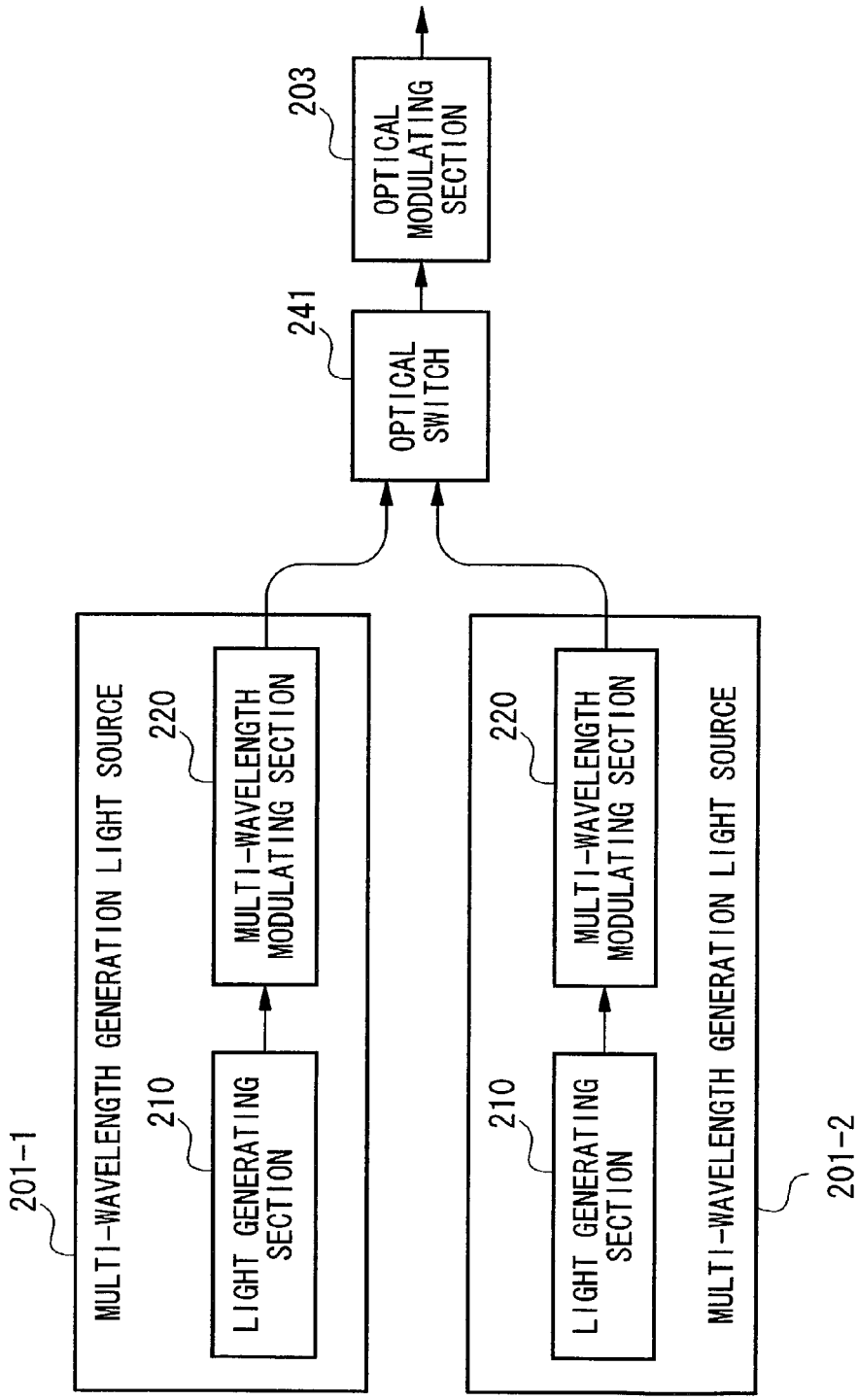
FIG. 12 is a block diagram showing the structure of the wavelength-division multiplexed optical signal transmitter according to a fifth embodiment of the present invention.

FIG. 12 shows the fifth embodiment of the wavelength-division multiplexed optical signal transmitter of the present invention.

In FIG. 12 the wavelength-division multiplexed optical signal transmitter of the present embodiment is provided with two multi-wavelength generation light sources 201-1 and 201-2 and an optical switch 241 which selects one of the multi-wavelength generation light sources to connect the selected multi-wavelength generation light source to an optical modulating section 203. Note that the optical modulating section 203 forms a multi-wavelength optical modulation circuit. The two multi-wavelength generation light sources 201-1 and 201-2 are provided with a light generating section 210 and a multi-wavelength modulating section 220.

When an abnormality occurs in multi-wavelength light output from the one (working) multi-wavelength generation light source that is selected, the optical switch 241 switches automatically or manually to the other (protection) multi-wavelength generation light source. As a result, a stable supply of multi-wavelength light to the optical modulating section 203 is obtained.

Here, as the multi-wavelength generation light source 201 shown in FIG. 12, a multi-wavelength generation light source can be used that, for example, performs phase modulation and intensity modulation (amplitude modulation) using electrical signals (e.g., sinusoidal waves) having a specific repetition cycle on light having a single center frequencies, and that generates multi-wavelength light having a plurality of center wavelengths by generating sidebands (Japanese Patent Application No. 2001-199790 (referred to below as the "prior application").

Figure 13:
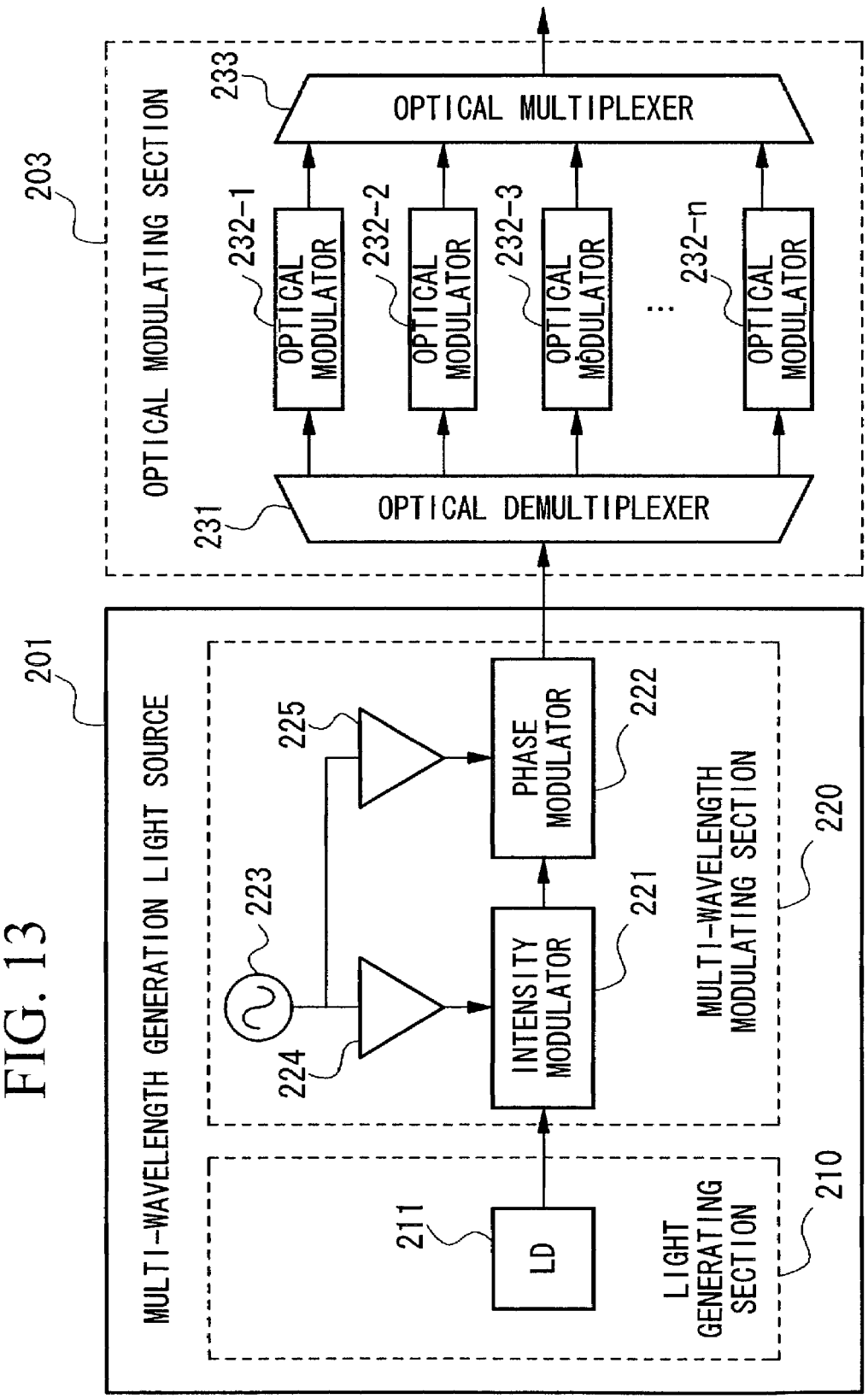
FIG. 13 is a block diagram showing a structural example of a wavelength-division multiplexed optical signal transmitter that uses a multi-wavelength generation light source.
Figure 14A:
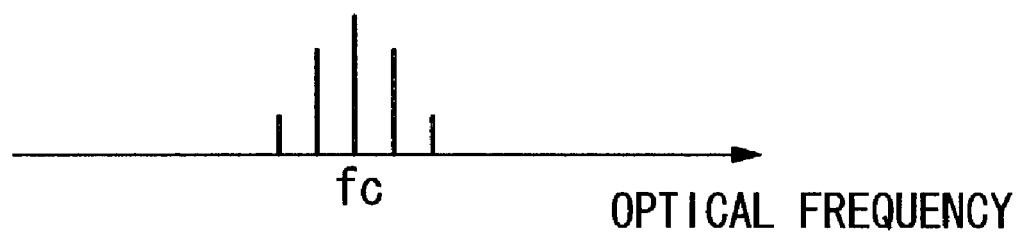
FIGS. 14A to 14C are diagrams showing the principle of the multi-wavelength light generation by a multi-wavelength generation light source.
Figure 14B:
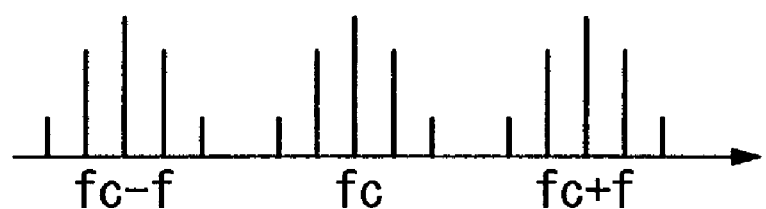
Figure 14C:
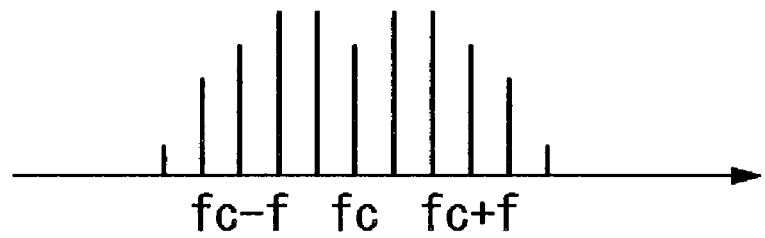

FIG. 13 shows a structural example of a wavelength-division multiplexed optical signal transmitter that uses the multi-wavelength generation light source of the prior application. Note that in FIG. 13 the optical switch 241 shown in FIG. 12 is omitted from the drawing. Further, FIGS. 14A to 14C show the principle of the generation of multi-wavelength light in the multi-wavelength generation light source of the prior application.

In FIG. 13, the multi-wavelength generation light source 201 is provided with a light generating section 210 and a multi-wavelength modulating section 220. The light generating section 210 has a semiconductor laser (LD) 211 that generates light having a single center wavelength. The multi-wavelength modulating section 220 is provided with an intensity modulator 221 that modulates the intensity (modulates the amplitude) of light output from the light generating section 210 and a phase modulator 222 that modulates the phase of light output from the light generating section 210 (the order of the respective modulators is optional), a cyclic signal generator 223 that generates predetermined cyclic signals (a sinusoidal wave) to be applied to each modulator, and voltage adjusting sections 224 and 225 that adjust the applied voltage and bias voltage of the cyclic signals. The multi-wavelength modulating section 220 may also use, for example, a Mach-Zehnder intensity modulator to perform phase modulation in a branched path and allow an overall intensity modulation (amplitude modulation) to be performed.

The intensity modulator 221 modulates the amplitude of the temporal waveform of the light (continuous light) output from the light generating section 210 using a fixed frequency corresponding to the desired wavelength spacing. As a result, an optical spectrum having the output frequency of the light generating section in the center and sidebands of discrete wavelengths of the relevant frequency spacing is obtained as the output light (FIG. 14A). Furthermore, the phase modulator 222 modulates the phase of the modulated light; thereby the discrete optical spectrum is deviated to the upper and lower sidebands in the frequency domain (FIG. 14B). Here, since the discrete optical spectra superpose by the adjustment of the frequency deviation amount, it is possible to control the deviation in the power level of each sideband at a constant amount (FIG. 14C).

As is shown in FIG. 4 (the first embodiment), the light generating section 210 may also be provided with n number of semiconductor lasers (LD) 11-1 to 11-n that generate light that each has a different center frequency, and that uses the optical multiplexer 12 to multiplex laser light and to output multiplexed light. In this case, the multi-wavelength modulating section 20 (see FIG. 4) generates sidebands for each center wavelength, so that multi-wavelength light can be generated across an even wider frequency band.

When the wavelength-division multiplexed optical signal transmitter is formed using the multi-wavelength generation light source of the prior application, as is shown in FIG. 13, an optical modulator 203 having an optical demultiplexer 231 that spectrum slices the multi-wavelength light into the respective wavelengths is used. In the optical modulating section 203, the optical modulators 232-1 to 232-n modulate the light of the respective wavelengths demultiplexed by the optical demultiplexer 231 using transmission signals, the optical multiplexer 233 performs wavelength-division multiplexing on the respective modulated signal light.

Compared with the structure of the wavelength-division multiplexed optical signal transmitter in which the same number of semiconductor lasers are prepared as the number of channels, the wavelength-division multiplexed optical signal transmitter shown in FIG. 13 is smaller in size and allows a reduction in costs for light sources per channel to be achieved.

Moreover, because the properties of the semiconductor laser are such that an oscillation wavelength shift is generated by changes in temperature and changes in the injection current, and because the oscillation wavelength also changes over time, a wavelength stabilization circuit is necessary to maintain wavelength accuracy in the transmission specifications. Because wavelength stabilization needs to be performed for each semiconductor laser the semiconductor lasers and wavelength stabilization circuits increase and the size of the circuitry in the wavelength-division multiplexed optical signal transmitter increases in proportion to the increase in number of wavelength-division multiplexes and the increase in density in the wavelength-division multiplexing spacing. In contrast, as is shown in FIG. 13, by employing a structure in which the light generating section 210 is formed by a single semiconductor laser there does not need to be any increase in the size of the circuitry.

[SIXTH Embodiment]

Figure 15:
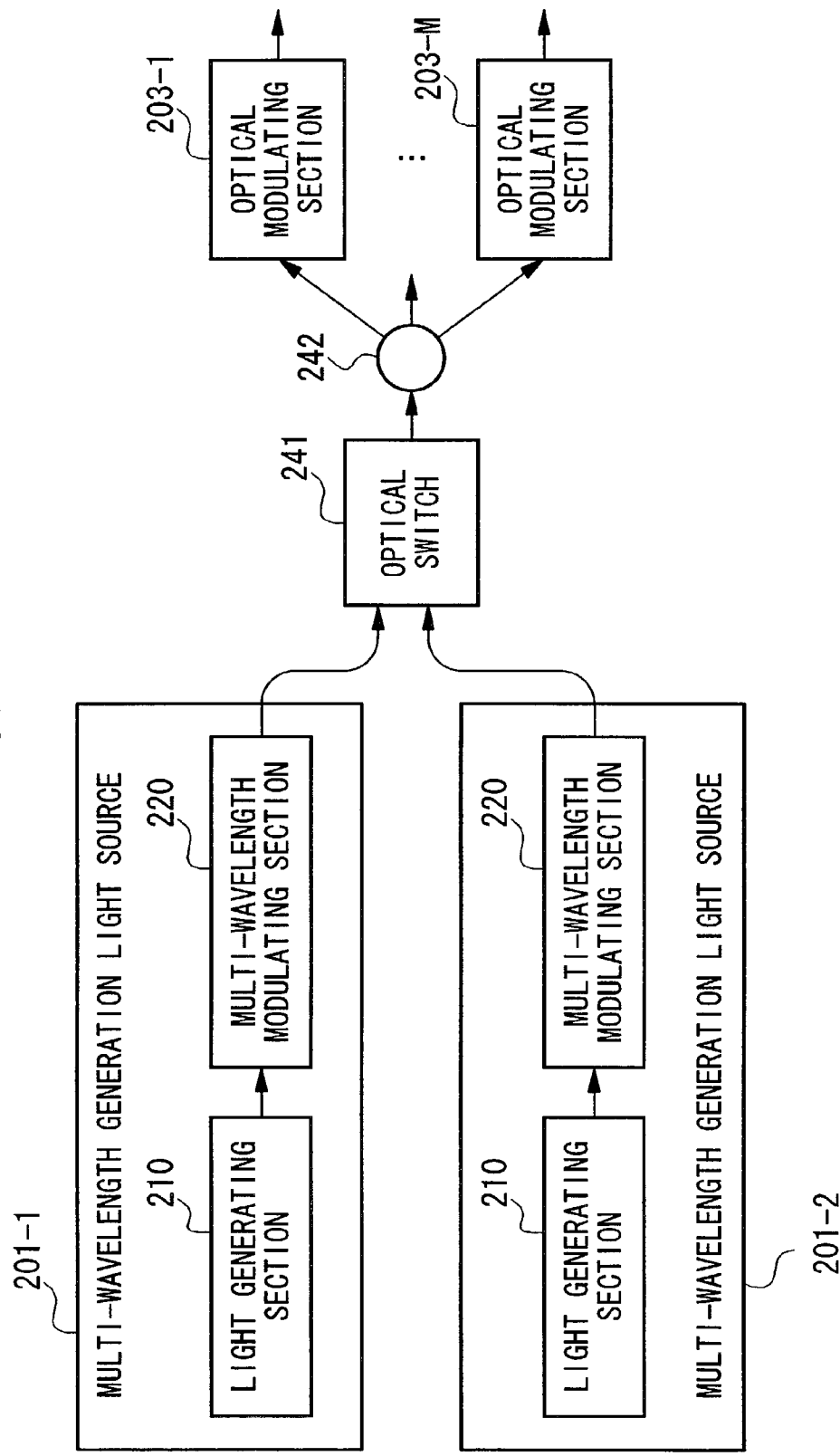
FIG. 15 is a block diagram showing the structure of the wavelength-division multiplexed optical signal transmitter according to a sixth embodiment of the present invention.

FIG. 15 shows the sixth embodiment of the wavelength-division multiplexed optical signal transmitter of the present invention.

As is shown in FIG. 15, in the same way as in the fifth embodiment, the wavelength-division multiplexed optical signal transmitter of the present embodiment enables multi-wavelength light to be stably supplied using the double multi-wavelength generation light sources 201-1 and 201-2, and distributes the multi-wavelength light to a plurality (i.e., M number) of optical modulating sections 203-1 to 203-M via an optical star coupler 242. This is substantially equivalent to being provided with a plurality (M number) of wavelength-division multiplexed optical signal transmitters. Namely, each wavelength-division multiplexed optical signal transmitter of a plurality (M number) of WDM transmission systems are able to share the double multi-wavelength generation light sources 201-1 and 201-2, thereby making a more economical system structure possible. Note that the optical modulating sections 203-1 to 203-M form a multi-wavelength optical modulation circuit.

[Seventh Embodiment]

Figure 16:
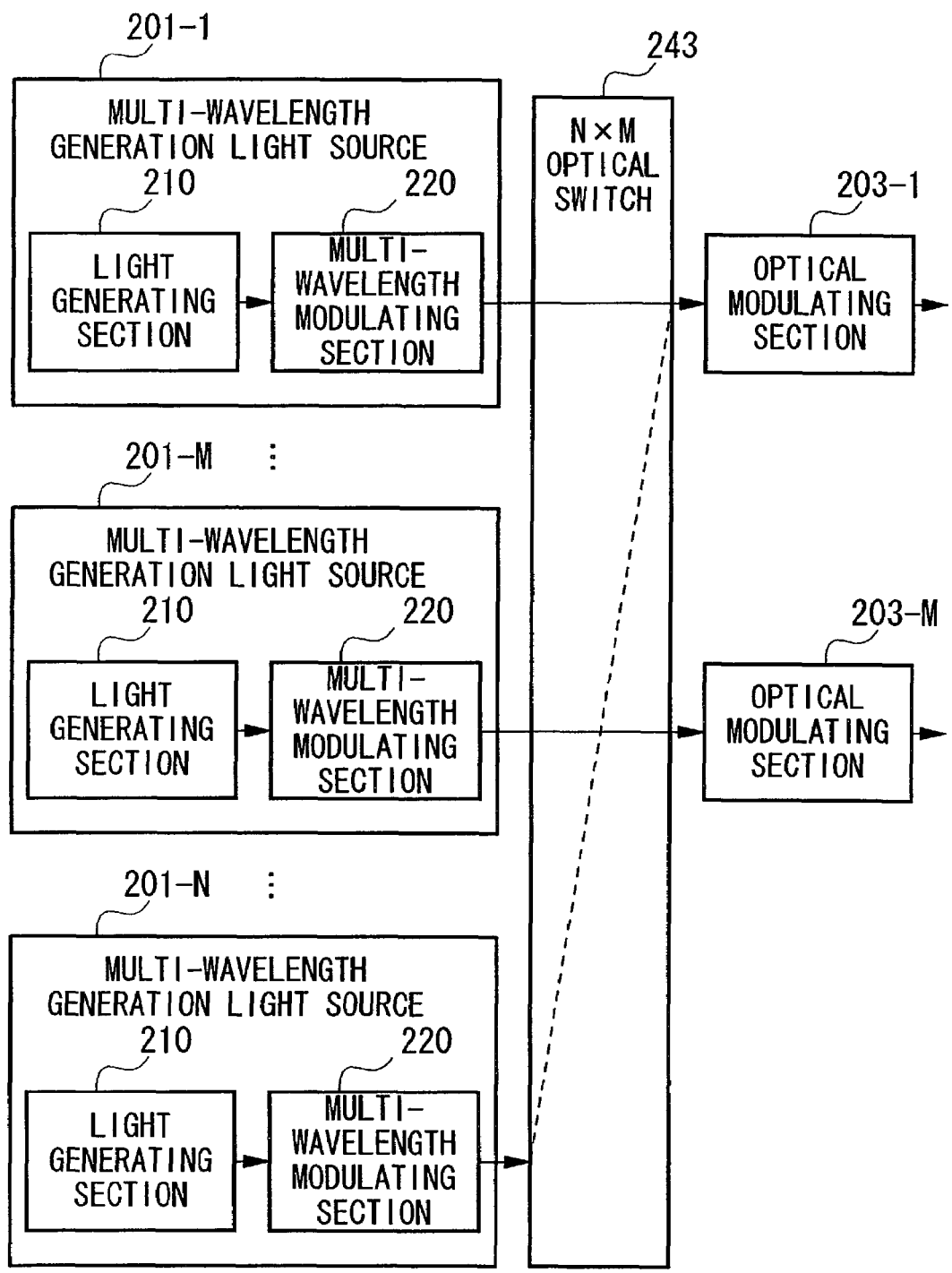
FIG. 16 is a block diagram showing the structure of the wavelength-division multiplexed optical signal transmitter according to a seventh embodiment of the present invention.

FIG. 16 shows the seventh embodiment of the wavelength-division multiplexed optical signal transmitter of the present invention.

As shown in FIG. 16, the wavelength-division multiplexed optical signal transmitter of the present embodiment is provided with a plurality (i.e., N number) of multi-wavelength generation light sources 201-1 to 201-N that is more (i.e., N>M) than the plurality (i.e., M number) of optical modulating sections 203-1 to 203-M. Note that the optical modulating sections 203-1 to 203-M form a multi-wavelength optical modulation circuit. The M number of multi-wavelength generation light sources 201-1 to 201-M and optical modulating sections 203-1 to 203-M are connected respectively one to one via an N×M optical switch 243. A number (N−M) of multi-wavelength generation light sources i.e., 201-(M+1) to 201-N are protection light sources. The multi-wavelength generation light sources 201-1 to 201-N have the same structure as the multi-wavelength generation light sources of the prior application shown in FIG. 13 or FIG. 4, and are provided with the light generating section 210 and the multi-wavelength modulating section 220. The optical modulating sections 203-1 to 203-M also have the same structure as the optical modulating section 203 shown in FIG. 13. As a result, this is substantially equivalent to being provided with a plurality (M number) of wavelength-division multiplexed optical signal transmitters.

If a fault occurs, for example, in the multi-wavelength generation light source 201-1, the N×M optical switch 243 switches the connection of the optical modulating section 203-1 with the multi-wavelength generation light source 201-1 to a connection with the protection multi-wavelength generation light source 201-N. The N×M optical switch 243 is able to make arbitrary connections. For example, if N=M+2, it is able to switch to protection light sources even if faults occur in two arbitrary multi-wavelength generation light sources, and is thereby able to provide a stable supply of multi-wavelength light.

[Eight Embodiment]

Figure 17:
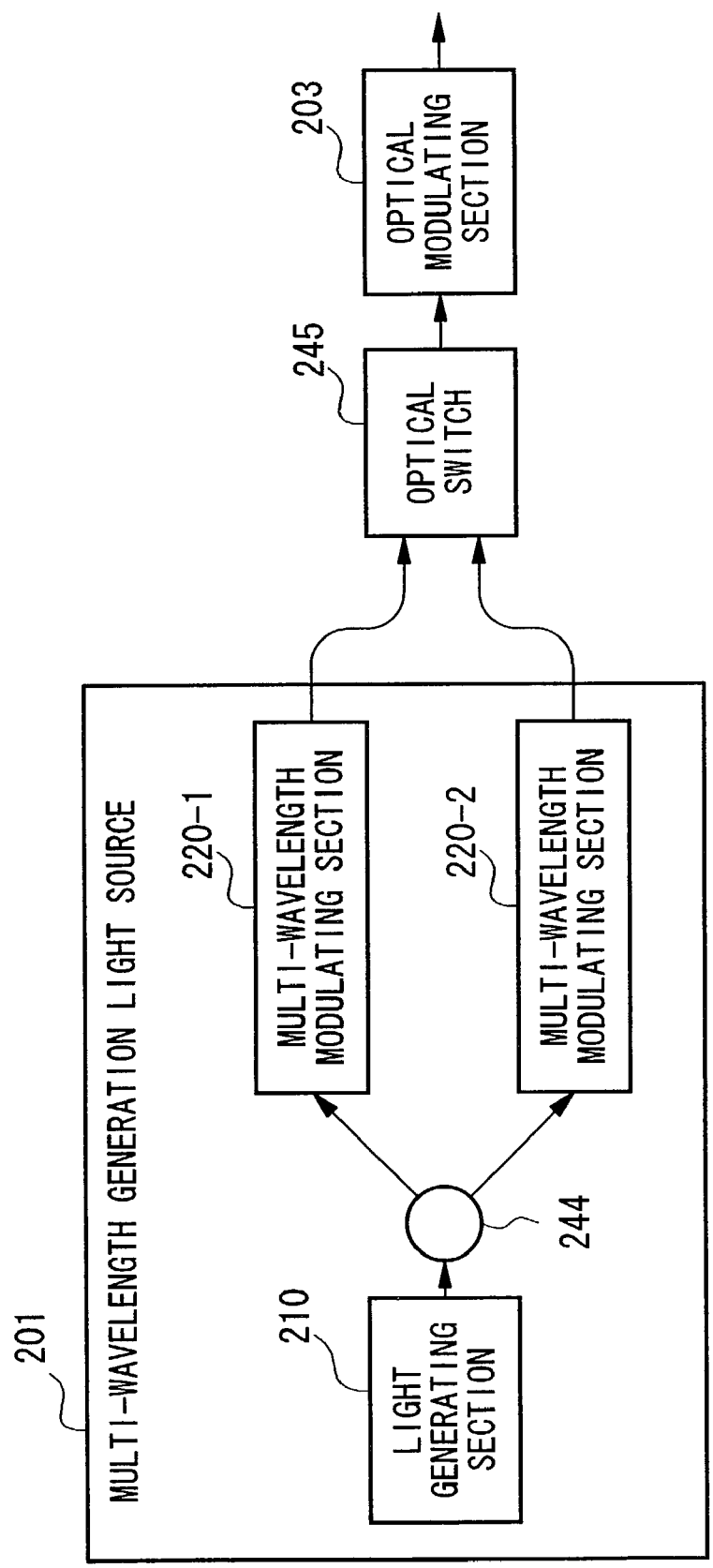
FIG. 17 is a block diagram showing the structure of the wavelength-division multiplexed optical signal transmitter according to an eighth embodiment of the present invention.

FIG. 17 shows the eighth embodiment of the wavelength-division multiplexed optical signal transmitter of the present invention.

As shown in FIG. 17, in the wavelength-division multiplexed optical signal transmitter of the present embodiment, the multi-wavelength generation light source 201 is provided with a single light generating section 210 and two multi-wavelength modulating sections 220-1 and 220-2, and light output from the light generating section 210 is distributed to the multi-wavelength modulating sections 220-1 and 220-2 via an optical coupler 244. The multi-wavelength light output from one of the multi-wavelength modulating sections 220-1 and 220-2 that is selected by the optical switch 245 is input into the optical modulating section 203. Note that the optical modulating section 203 forms a multi-wavelength optical modulation circuit. The light generating section 210 and the multi-wavelength modulating sections 220-1 and 220-2 have the same structures as the light generating section 210 and the multi-wavelength modulating section 220 in the multi-wavelength generation light source 201 of the prior application shown in FIG. 13, or as the light generating section 10 and the multi-wavelength modulating section 20 shown in FIG. 4. The optical modulating section 203 also has the same structure as that shown in FIG. 13.

When an abnormality occurs in multi-wavelength light output from the multi-wavelength modulating section that is selected, the optical switch 245 switches automatically or manually to the other multi-wavelength modulating section. As a result, a stable supply of multi-wavelength light to the optical modulating section 203 is obtained.

[Ninth Embodiment]

Figure 18:
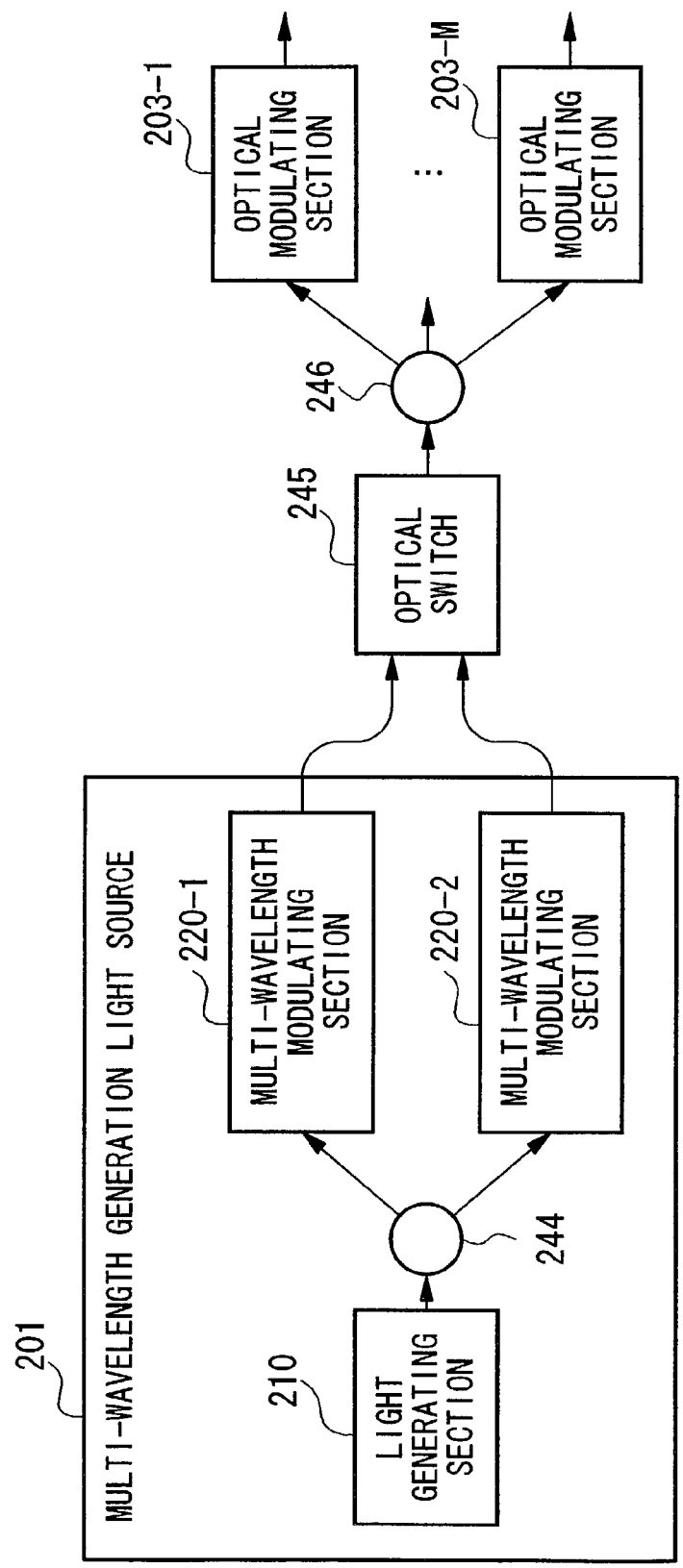
FIG. 18 is a block diagram showing the structure of the wavelength-division multiplexed optical signal transmitter according to a ninth embodiment of the present invention.

FIG. 18 shows the ninth embodiment of the wavelength-division multiplexed optical signal transmitter of the present invention.

As shown in FIG. 18, in the same way as in the eighth embodiment, in addition to the stable supply of multi-wavelength light being provided by the double multi-wavelength modulating sections 220-1 and 220-2, the wavelength-division multiplexed optical signal transmitter of the present embodiment distributes the multi-wavelength light to a plurality (i.e., M number) of optical modulating sections 203-1 to 203-M via an optical star coupler 246. Note that the optical modulating sections 203-1 to 203-M form a multi-wavelength optical modulation circuit. This is substantially equivalent to being provided with a plurality (M number) of wavelength-division multiplexed optical signal transmitters. Namely, each wavelength-division multiplexed optical signal transmitter of a plurality (M number) of WDM transmission systems are able to share the double multi-wavelength modulating sections 220-1 and 220-2, thereby making a more economical system structure possible.

[Tenth Embodiment]

Figure 19A:
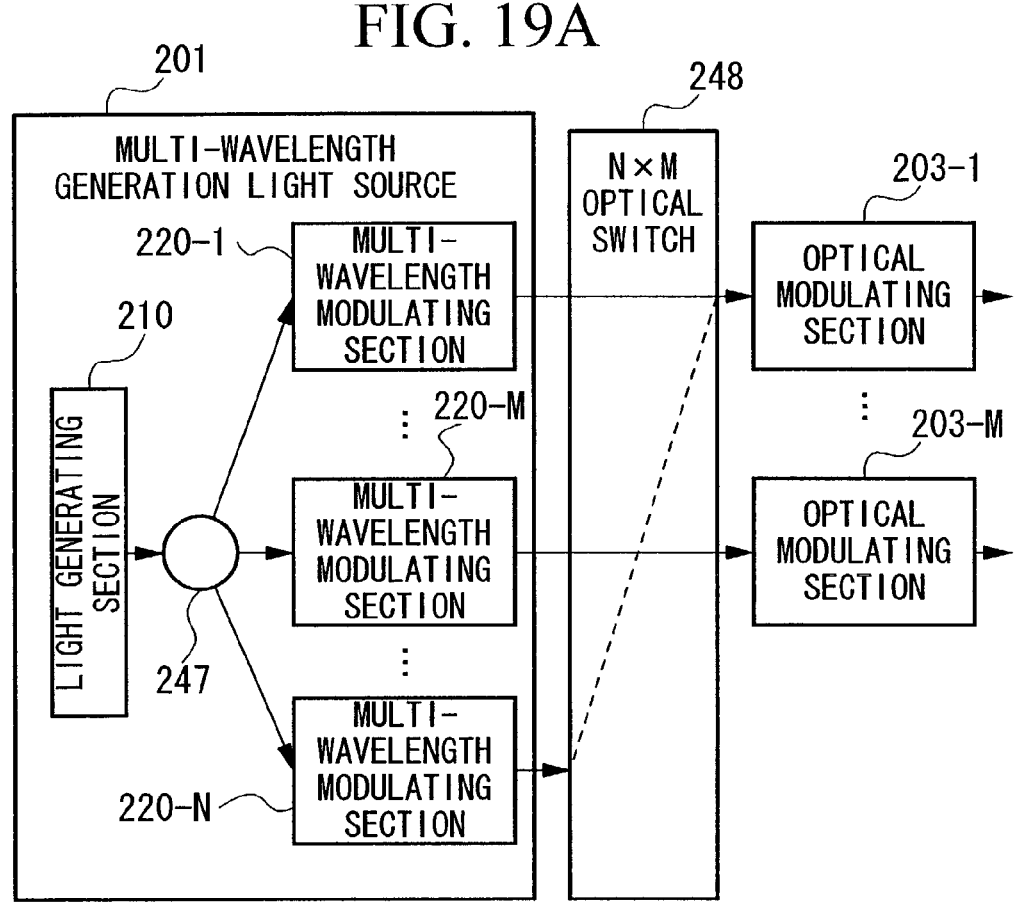
FIGS. 19A and 19B are block diagrams showing the structure of the wavelength-division multiplexed optical signal transmitter according to a tenth embodiment of the present invention.
Figure 19B:
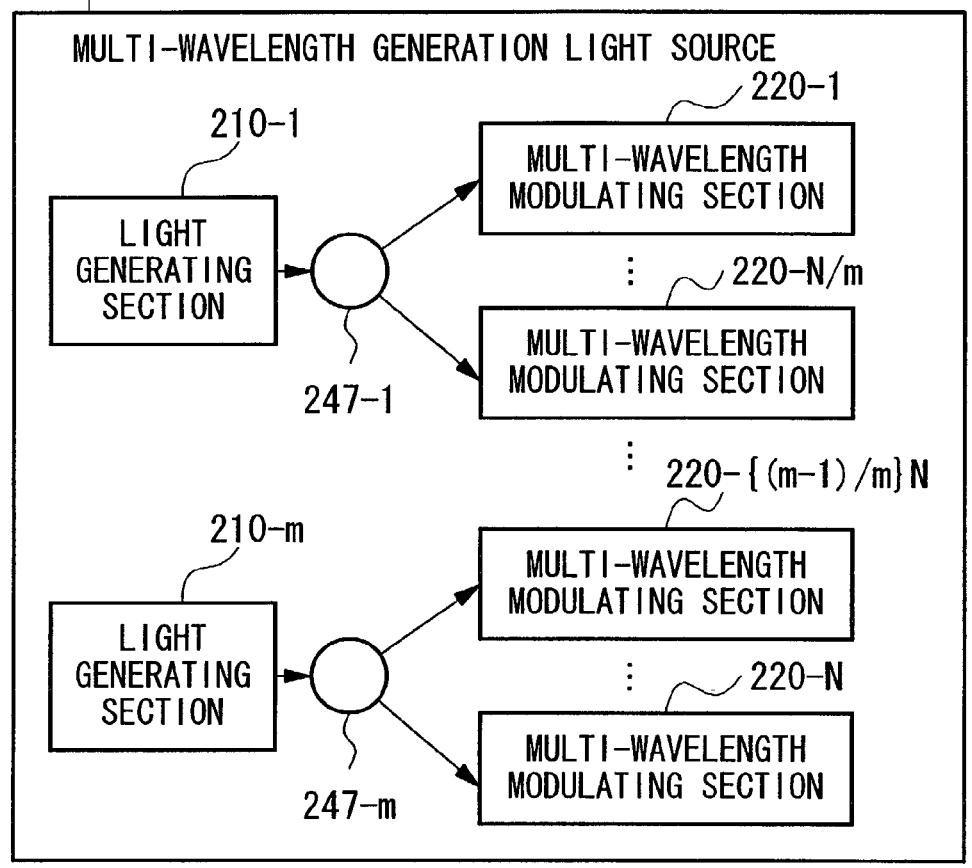

FIGS. 19A and 19B show the tenth embodiment of the wavelength-division multiplexed optical signal transmitter of the present invention.

As shown in these drawings, the wavelength-division multiplexed optical signal transmitter of the present embodiment is provided with a plurality (i.e., N number) of multi-wavelength modulating sections 220-1 to 220-N that is more (i.e., N>M) than the plurality (i.e., M number) of optical modulating sections 203-1 to 203-M. Note that the optical modulating sections 203-1 to 203-M form a multi-wavelength optical modulation circuit. Light output from the light generating section 210 is distributed to the multi-wavelength modulating sections 220-1 to 220-N via an optical star coupler 247. The M number of multi-wavelength modulating sections 220-1 to 220-M and optical modulating sections 203-1 to 203-M are connected respectively one to one via an N×M optical switch 248. A number (N−M) of multi-wavelength modulating sections i.e., 220-(M+1) to 220-N are protection light sources. The light generating section 210 and the multi-wavelength modulating sections 220-1 to 220-N have the same structure as the light generating section 210 and the multi-wavelength modulating section 220 of the multi-wavelength generation light source 201 of the prior application shown in FIG. 13, or the light generating section 10 and the multi-wavelength modulating section 20 shown in FIG. 4. The optical modulating sections 203-1 to 203-M also have the same structure as that shown in FIG. 13. As a result, this is substantially equivalent to being provided with a plurality (M number) of wavelength-division multiplexed optical signal transmitters.

If a fault occurs, for example, in the multi-wavelength modulating section 220-1, the N×M optical switch 248 switches the connection between the optical modulating section 203-1 and the multi-wavelength modulating section 220-1 to a connection with the protection multi-wavelength modulating section 220-N. The N×M optical switch 248 is able to make arbitrary connections. For example, if N=M+2, it is able to switch to protection light sources even if faults occur in two arbitrary multi-wavelength modulating section, and is thereby able to provide a stable supply of multi-wavelength light.

Here, the number of light generating sections 210 is set at one; however, it is also possible to provide a plurality (i.e., m number) of light generating sections 210-1 to 210-m having the same structure. In this case, each light generating section distributes output light to N/m number (wherein N and m are integers) of multi-wavelength modulating sections, and all together delivers output light from the light generating sections 210-1 to 210-m to N number of multi-wavelength modulating sections 220-1 to 220-N (FIG. 19B).

Moreover, in the fifth, sixth, eighth, and ninth embodiments an example is given of a double structure, however, a redundant structure having three or more elements may also be employed. In the above described sixth and eighth to tenth embodiments, when branching loss from the optical star coupler or the optical coupler is too great, it is desirable to employ an optical amplifier for amplifying the optical power.

Because the wavelength-division multiplexed optical signal transmitter of the prior application shown in FIG. 13 generates multi-wavelength light by means of a single multi-wavelength generation light source 201, if a fault occurs in the multi-wavelength generation light source 201, then the supply of multi-wavelength light is completely halted. For example, if there is a fault in the multi-wavelength modulating section 220 of the multi-wavelength generation light source 201 the supply of multi-wavelength light generated for each channel is halted at the same time, and it is not possible to transmit all of the huge amount of information that was to be transmitted.

In contrast, in the above described fifth to tenth embodiments, because a plurality of multi-wavelength generation light sources or multi-wavelength modulating sections are provided, it is possible to prevent serious damage caused by a fault occurring in the working multi-wavelength generation light source or multi-wavelength modulating section.

In addition, because it is possible to improve the reliability of the multi-wavelength generation light source generating multi-wavelength light, an inexpensive and highly reliable wavelength-division multiplexed optical signal transmitter in which the advantages of the cost reduction of the multi-wavelength generation light source are put to full effect can be realized.

Next, a description will be given in sequence of the eleventh to fifteenth embodiments of the present invention, however, firstly, the background thereto will be described.

A lithium niobate (LN) modulator having excellent high-speed modulation characteristics is used as the optical modulator in the wavelength-division multiplexed optical signal transmitter. An LN modulator is structured such that a Mach-Zehnder interferometer is formed by an optical waveguide on a $LiNbO_3$ substrate, and the intensity of the output light is modulated by changing the refractive index of the optical waveguide due to the electrooptic effect. The modulation characteristics thereof vary depending on the angle of the plane of polarization of the input laser light. Namely, the LN modulator is polarization sensitive.

Figure 20:
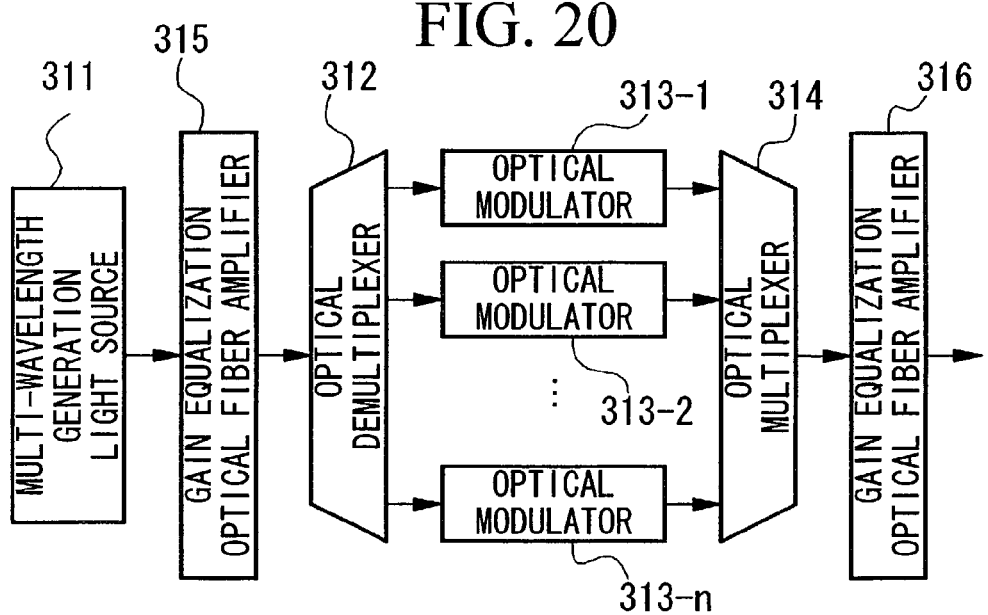
FIG. 20 is a block diagram showing an example of the structure of a conventional wavelength-division multiplexed optical signal transmitter that uses a multi-wavelength light source.

FIG. 20 shows an example of the structure of the wavelength-division multiplexed optical signal transmitter using an LN modulator as the optical modulator. In this structural example the light source of the wavelength-division multiplexed optical signal transmitter used for optical wavelength-division multiplexed (WDM) communication (i.e., the light source for WDM) is one that uses a multi-wavelength light source that outputs multi-wavelength light (Japanese Patent Application No. 2001-199791).

In FIG. 20, the optical demultiplexer 312 such as an arrayed waveguide grating (AWG) filter splits the wavelengths of the multi-wavelength light output from the multi-wavelength light source 311. As a result, a plurality of optical carriers having the same wavelength spacing are obtained. The optical modulator 313-1 to 313-n modulate the corresponding optical carriers of respective wavelengths, and the optical multiplexer 314 performs wavelength-division multiplexing on the respective modulated light to transmit the multiplexed light on the optical transmission path. Here, in order to make the difference in the level of each channel of the multi-wavelength light or wavelength-division multiplexing modulated light uniform at the input of the optical demultiplexer 312 and the output of the optical multiplexer 314, gain equalization optical fiber amplifiers 315 and 316, in which the gain is made constant over a given gain bandwidth, are inserted, and each one is amplified to a predetermined optical power.

Compared with a light source for WDM in which the same number of single mode lasers are provided as there are channels, the above multi-wavelength light source makes it possible to reduce the number of light sources, hence the wavelength settings for each channel can be made easily.

However, as was described above, because there is a polarization sensitivity in the LN modulator and it can only modulate light in a specific polarization state, it is necessary to provide all of the devices positioned upstream from the LN modulator with a polarization maintain function. Accordingly, in FIG. 20, it is necessary to use polarization maintain devices for the gain equalization optical fiber amplifier 315 and the optical demultiplexer 312 positioned on the input side of the structure shown in the drawing.

Generally, an arrayed waveguide grating (AWG) filter formed by PLC waveguides on a glass substrate (or organic waveguides on a silicon substrate) is used as the optical demultiplexer 312. Because the plane of polarization of this AWG is normally maintained, it is sufficient if a polarization maintain fiber is attached to an input and output pigtail.

However, to provide the gain equalization optical fiber amplifier 315 with a polarization maintain structure requires a high level of technology and is expensive, and thereby prevents the cost of the wavelength-division multiplexed optical signal transmitter from being lowered.

With these circumstances as the background, a wavelength-division multiplexed optical signal transmitter according to any one of the eleventh to fifteenth embodiments that uses an LN modulator achieves a reduction in cost while making the level difference between channels uniform.

[Eleventh Embodiment]

Figure 21:
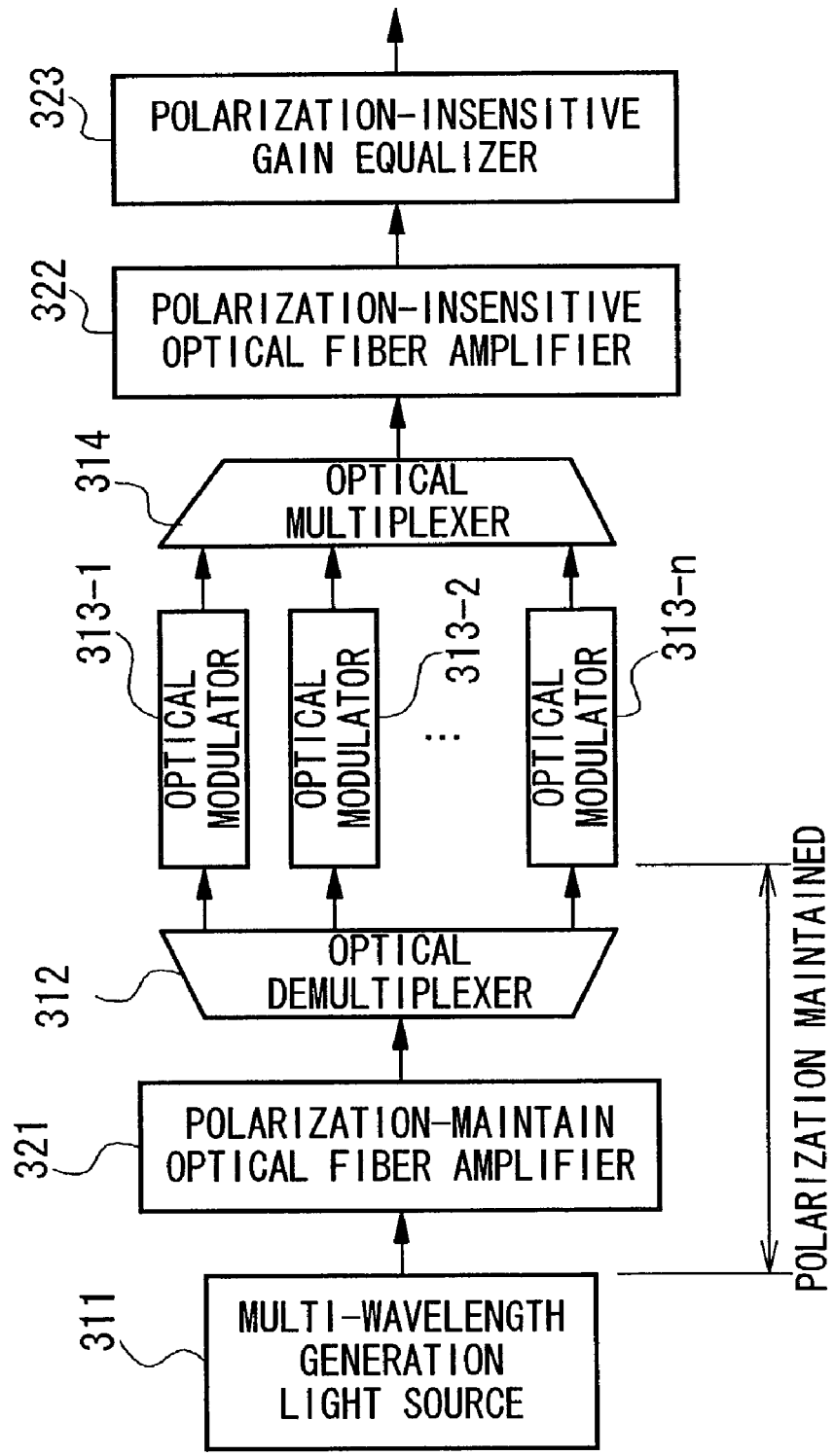
FIG. 21 is a block diagram showing the structure of the wavelength-division multiplexed optical signal transmitter according to an eleventh embodiment of the present invention.

FIG. 21 shows the eleventh embodiment of the present invention. The present embodiment is characterized in that in the wavelength-division multiplexed optical signal transmitter that uses the multi-wavelength light source 311 shown in FIG. 20, when an LN modulator is used as the optical modulator 313, instead of using a polarization maintain device as the gain equalization optical fiber amplifier 315 positioned on the input side of the optical modulator 313, the less expensive polarization maintain optical fiber amplifier 321 is used and gain equalization is performed to make the difference in level between channels on the output side of the optical modulators uniform. Note that because the optical demultiplexer 312 is originally a polarization maintain device, by mounting a polarization maintain optical fiber on the input and output pigtails, the input side of the optical modulator 313 is formed into a polarization maintain structure including the polarization maintain optical fiber amplifier 321.

In FIG. 21, the polarization maintain optical fiber amplifier 321 amplifies multi-wavelength light output from the multi-wavelength light source 311 and the demultiplexer 312 demultiplexes the amplified light into a plurality of optical carriers having the same wavelength spacing. The optical carriers of each wavelength are input at a respective predetermined polarization into the corresponding optical modulator (LN modulator) 313-1 to 313-n which modulate the input optical carriers. The optical multiplexer 314 performs wavelength-division multiplexing on the modulated light of each wavelength that is output from each of the optical modulators, then the polarization-insensitive optical fiber amplifier 322 amplifies to a predetermined optical power. The polarization-insensitive gain equalizer 323 then makes the optical level of each wavelength uniform, and transmits the light along an optical transmission path.

The optical fiber amplifier uses as the amplifying medium an optical fiber to which rare earth ions such as erbium have been doped. Generally, the optical fiber amplifier is a polarization insensitive device in which the plane of polarization of the incident light is not maintained. By using an optical fiber formed by doping rare earth ions to the core of a polarization maintain optical fiber such as a PANDA fiber as the optical fiber used as the amplifying medium, it is possible to obtain the polarization maintain optical fiber amplifier 321 in which the plane of polarization of incident light is maintained.

Figure 22:
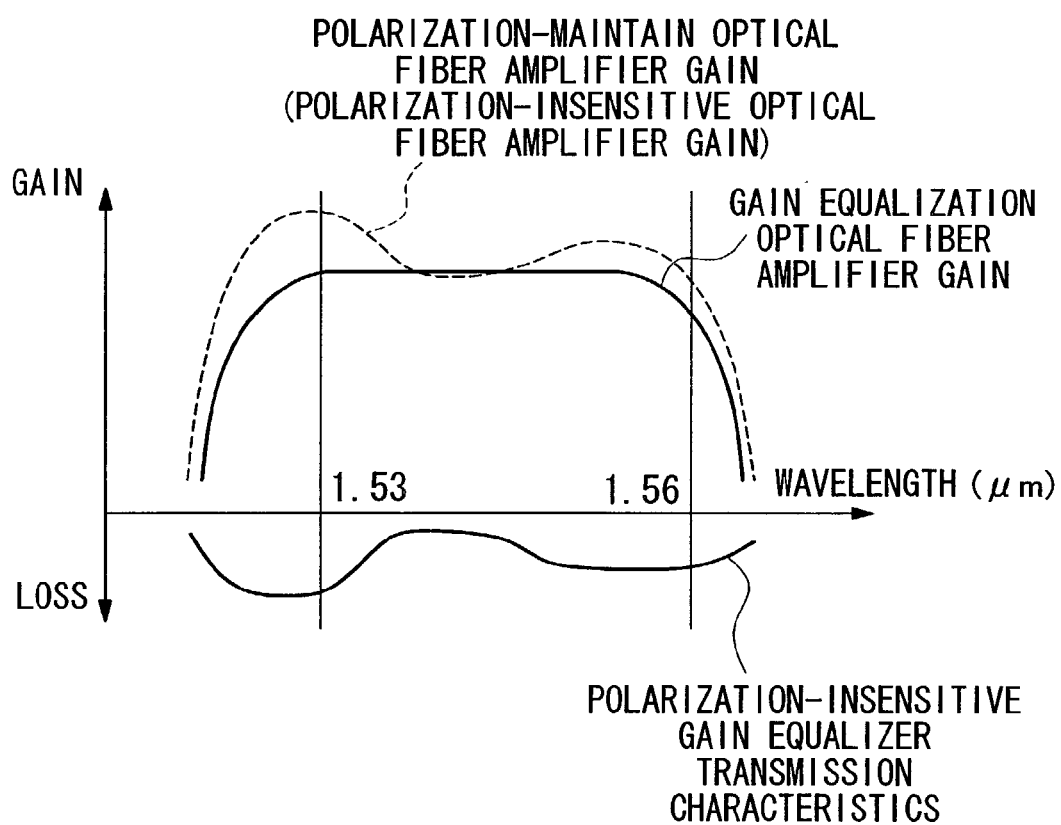
FIG. 22 is a diagram showing the operation of gain equalization in the eleventh embodiment.

However, as is shown in FIG. 22, an optical fiber amplifier generally has two wavelengths, 1.53 µm and 1.56 µm, where the gain is at the peak. This applies also to the polarization maintain optical fiber amplifier 321 and the polarization-insensitive optical fiber amplifier 322, and the gain within the gain frequency band is not constant. Therefore, the difference in level between channels is made uniform using the polarization-insensitive gain equalizer 323. Namely, the polarization-insensitive gain equalizer 323 has transmission characteristics (loss characteristics) that flatten the product of the gain characteristics of the polarization maintain optical fiber amplifier 321 and the polarization-insensitive optical fiber amplifier 322, and may be formed, for example, by combining optical fiber gratings having several types of transmission characteristics. As is shown in FIG. 22, by gain equalizing the gain characteristics of the polarization maintain optical fiber amplifier 321 and the polarization-insensitive optical fiber amplifier 322 using the loss characteristics of the polarization-insensitive gain equalizer 323, the same flattened transmission characteristics are obtained as from the gain equalization optical fiber amplifiers 315 and 316 (see FIG. 20). Note that the order in which the polarization-insensitive optical fiber amplifier 322 and the polarization-insensitive gain equalizer 323 are placed is arbitrary.

[Twelfth Embodiment]

Figure 23A:
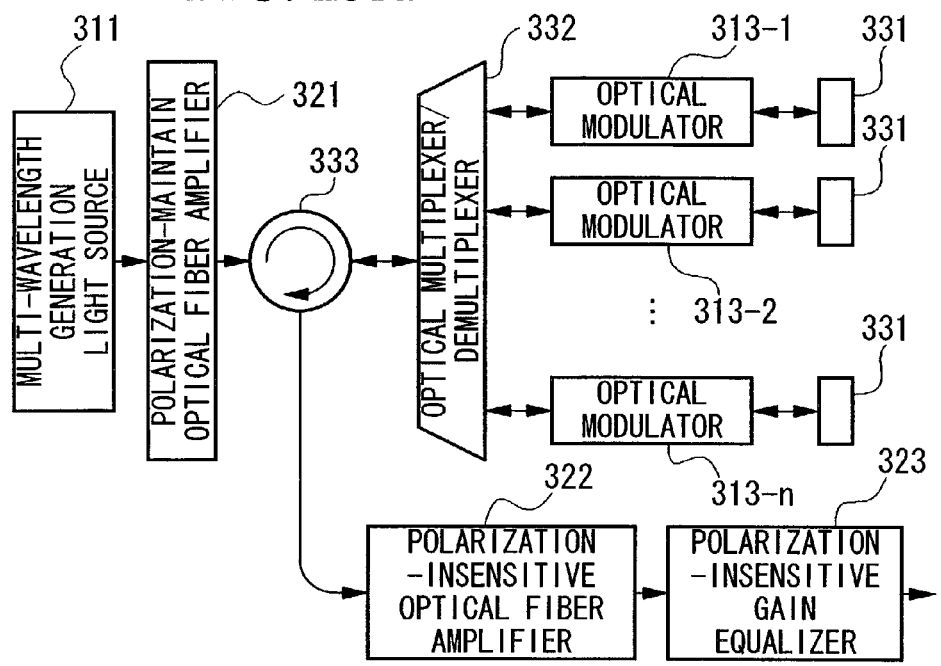
FIGS. 23A and 23B are block diagrams showing the structure of the wavelength-division multiplexed optical signal transmitter according to a twelfth embodiment of the present invention.
Figure 23B:
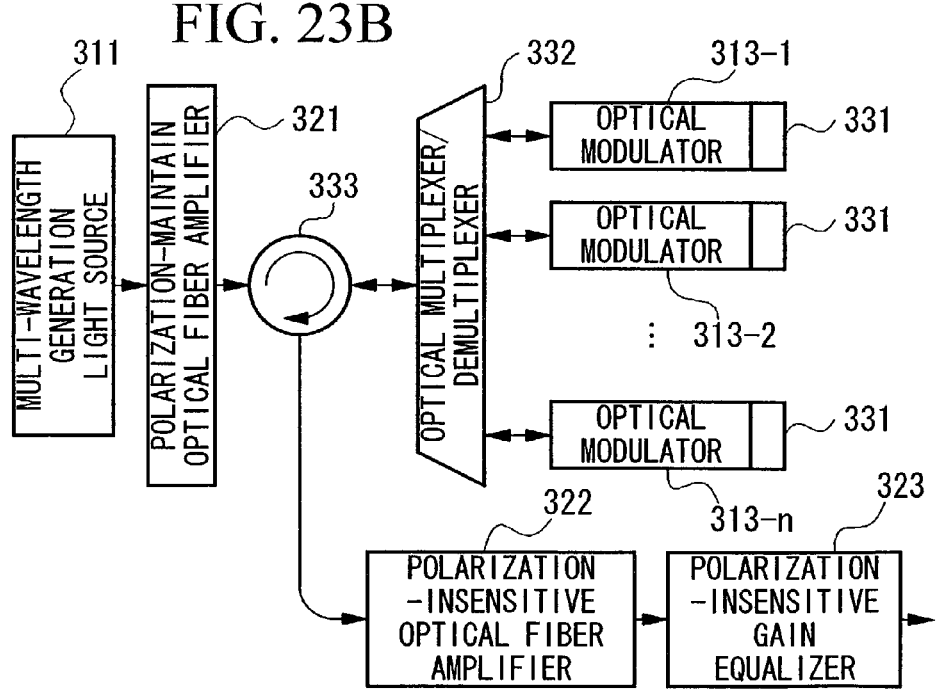

FIGS. 23A and 23B show the twelfth embodiment of the present invention. The feature of the twelfth embodiment is, in the structure of the eleventh embodiment shown in FIG. 21, the uniting of the optical demultiplexer 312 and the optical multiplexer 314 as a single optical multiplexer/demultiplexer 332 using light reflection device 331 (called an LN modulation device in which an optical modulator and a light reflection device are combined) that reflects the output of the optical modulators 313-1 to 313-n. Note that the output from the polarization maintain optical fiber amplifier 321 is connected to the optical multiplexer/demultiplexer 332. Furthermore, in order to supply the multiplexed output from the optical multiplexer/demultiplexer 332 to the polarization-insensitive optical fiber amplifier 322, the optical circulator 333 or an optical input/output device having the same functions as the optical circulator 333 is used.

In FIG. 23A, the polarization maintain optical fiber amplifier 321 amplifies multi-wavelength light output from the multi-wavelength light source 311. The amplified light is input into the optical multiplexer/demultiplexer 332 via the optical circulator 333. The optical multiplexer/demultiplexer 332 demultiplexes input light into a plurality of optical carriers having the same wavelength spacing. The optical modulator (LN modulator) 313-1 to 313-n modulate the corresponding optical carriers of each wavelength, and the light reflection device 331 reflects the modulated light, and then the optical multiplexer/demultiplexer 332 performs wavelength-division multiplexing. The wavelength-division multiplexed light is transmitted to the polarization-insensitive optical fiber amplifier 322 via the optical circulator 333 which amplifies the transmitted light to a predetermined optical power. The polarization-insensitive gain equalizer 323 makes the optical level of each wavelength uniform, and then transmits the light along an optical transmission path.

Note that, for example, a mirror coated with a metal film or a dielectric multilayer can be used as the light reflection device 331. Alternatively, a diffraction grating or fiber Bragg grating, which is a device for reflecting a specific wavelength, or the like can be used.

Note that it is also possible to employ a structure in which the optical modulator 313 and the light reflection device 331 are optically connected by an optical fiber or optical waveguide, as is shown in FIG. 23A, or to employ a structure in which these two are in contact with each other, as is shown in FIG. 23B.

[Thirteenth Embodiment]

Figure 24A:
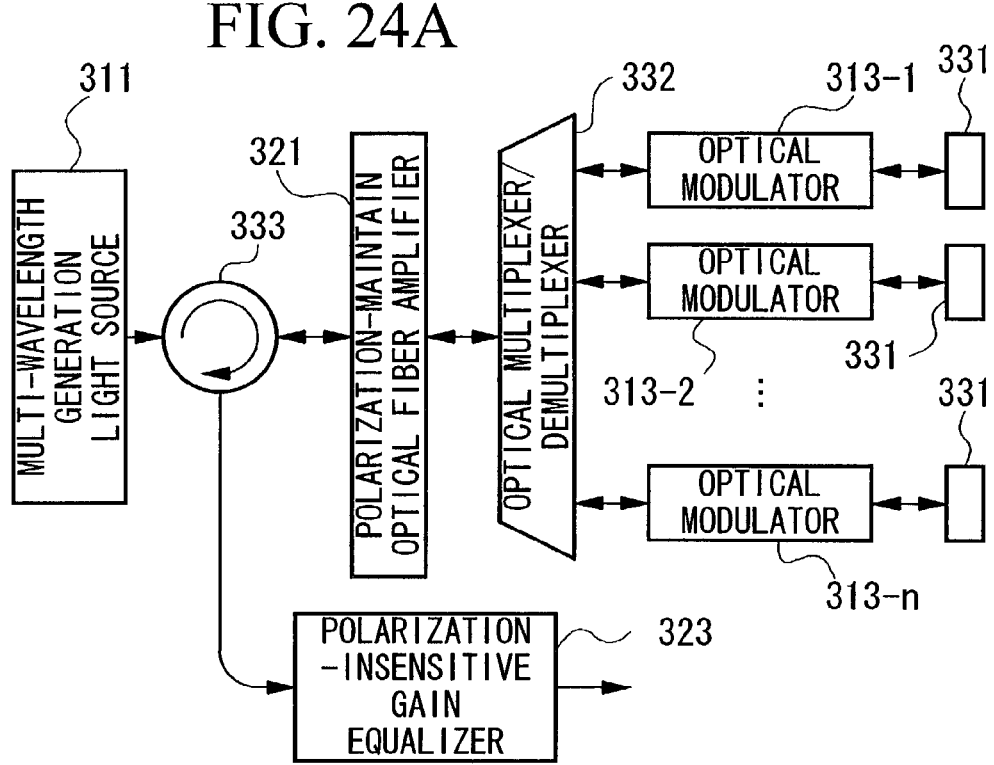
FIGS. 24A and 24B are block diagrams showing the structure of the wavelength-division multiplexed optical signal transmitter according to a thirteenth embodiment of the present invention.
Figure 24B:
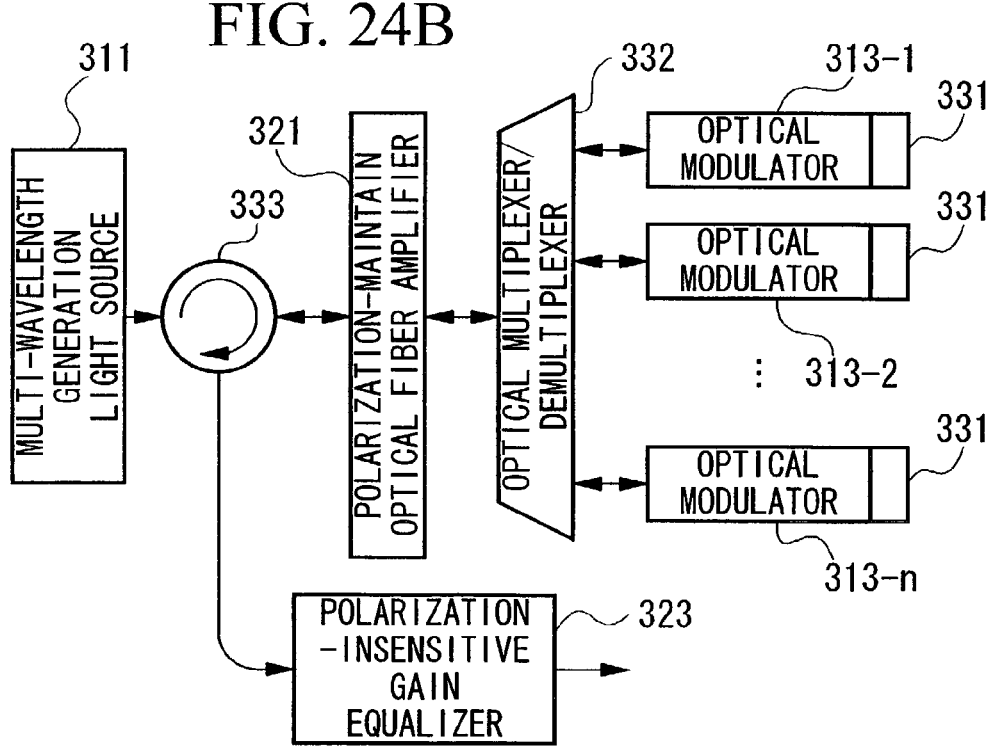

FIGS. 24A and 24B show the thirteenth embodiment of the present invention. The features of the thirteenth embodiment are, in the structure of the twelfth embodiment shown in FIGS. 23A and 23B, the polarization maintain optical fiber amplifier 321 also performing the functions of the polarization-insensitive optical fiber amplifier 322, and the polarization maintain optical fiber amplifier 321 being positioned between the optical circulator 333 and the optical multiplexer/demultiplexer 332. Namely, the polarization maintain optical fiber amplifier 321 is a bi-directional amplifier. As a result, the cost can be reduced even further.

In FIG. 24A, multi-wavelength light output from the multi-wavelength light source 311 is input into the polarization maintain optical fiber amplifier 321 via the optical circulator 333. The polarization maintain optical fiber amplifier 321 amplifies the multi-wavelength light to output to the optical multiplexer/demultiplexer 332. The optical multiplexer/demultiplexer 332 demultiplexes the amplified light into a plurality of optical carriers having the same wavelength spacing. The optical modulator (LN modulator) 313-1 to 313-n modulate the corresponding optical carriers of each wavelength, and then the light reflection device 331 reflects the modulated light. The optical multiplexer/demultiplexer 332 performs wavelength-division multiplexing on the reflected light, and the polarization maintain optical fiber amplifier 321 amplifies the resultant wavelength-division multiplexed light to a predetermined optical power, and the amplified light is transmitted to the polarization-insensitive gain equalizer 323 via the optical circulator 333. The polarization-insensitive gain equalizer 323 makes the optical level of each wavelength uniform, and transmits the light along an optical transmission path.

Note that it is also possible to employ a structure in which the optical modulator 313 and the light reflection device 331 are optically connected by an optical fiber or optical waveguide, as is shown in FIG. 24A, or to employ a structure in which these two are in contact with each other, as is shown in FIG. 24B.

In the twelfth embodiment, it is necessary for the polarization-insensitive gain equalizer 323 to equalize the two wavelength sensitivities of the polarization maintain optical fiber amplifier 321 and polarization-insensitive optical fiber amplifier 322. In contrast, in the present embodiment because it is only necessary to equalize the wavelength sensitivity of the one polarization maintain optical fiber amplifier 321, it is easy to set the wavelength characteristics of the polarization-insensitive gain equalizer 323.

[Fourteenth Embodiment]

Figure 25:
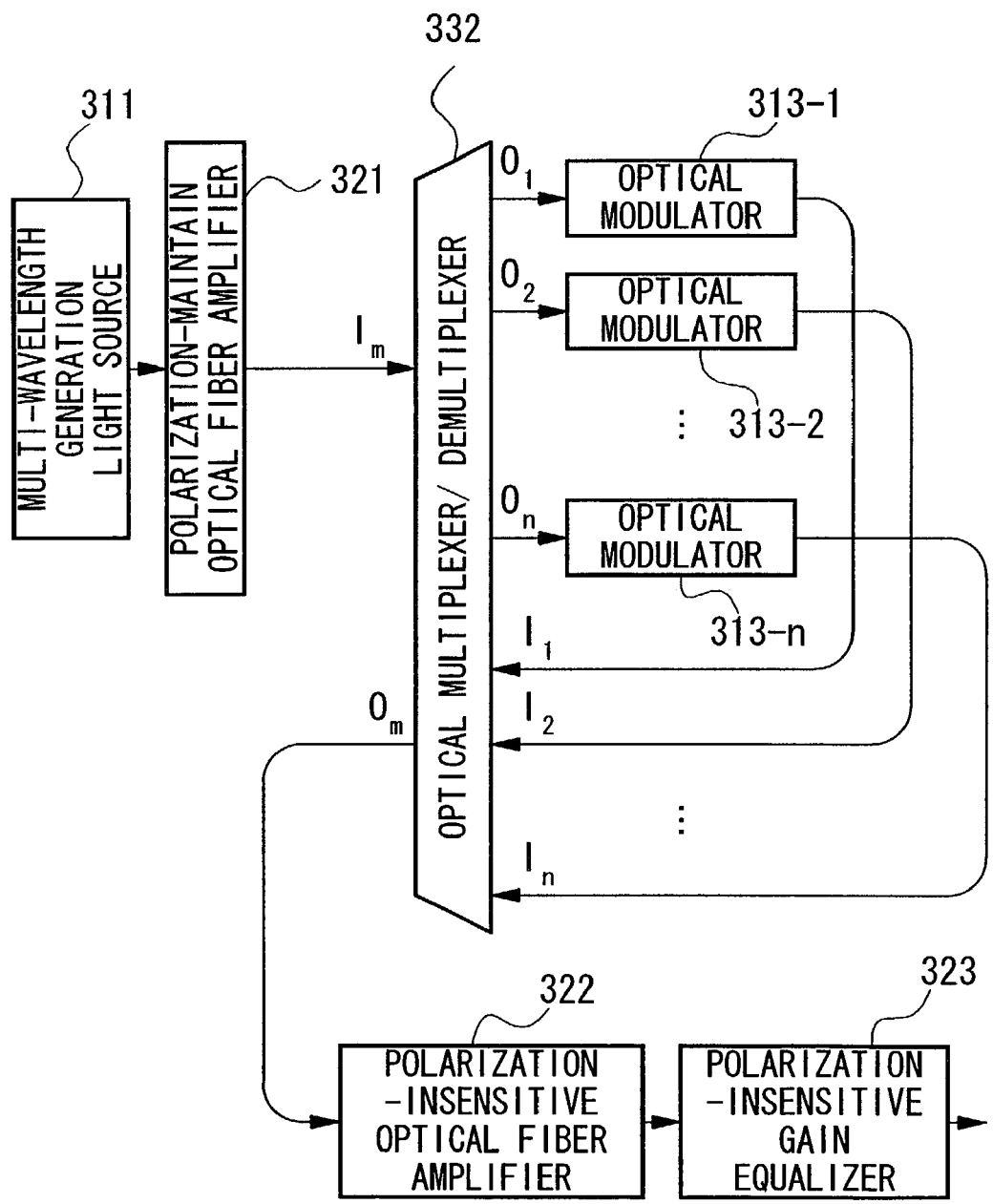
FIG. 25 is a block diagram showing the structure of the wavelength-division multiplexed optical signal transmitter according to a fourteenth embodiment of the present invention.

FIG. 25 shows the fourteenth embodiment of the present invention. The feature of the present embodiment is that, instead of using the light reflection device 331 as in the twelfth embodiment shown in FIGS. 23A and 23B, the output from the optical modulators 313-1 to 313-n is output to ports I1 to In that are separate from the ports O1 to On of the optical multiplexer/demultiplexer 332 for outputting optical carriers to the optical modulators, and the multiplexed output thereof is output from another port Om and input into the polarization-insensitive optical fiber amplifier 322, thereby omitting the optical circulator 333. The optical multiplexer/demultiplexer 332 can be achieved using an AWG.

In FIG. 25, the polarization maintain optical fiber amplifier 321 amplifies multi-wavelength light output from the multi-wavelength light source 311, and the amplified light is input into the optical multiplexer/demultiplexer 332. The optical multiplexer/demultiplexer 332 demultiplexes the amplified light into a plurality of optical carriers having the same wavelength spacing. The optical modulator (LN modulator) 313-1 to 313-n modulates the corresponding optical carriers of each wavelength, and the modulated light is output to the optical multiplexer/demultiplexer 332. The optical multiplexer/demultiplexer 332 performs wavelength-division multiplexing to output the resultant wavelength-division multiplexed light from the port Om that is different from the port Im into which the multi-wavelength light is input. The polarization-insensitive optical fiber amplifier 322 amplifies the output light to a predetermined optical power. The polarization-insensitive gain equalizer 323 makes the optical level of each wavelength uniform, and transmits the light along an optical transmission path.

Note that the structure of the present embodiment can be seen as a structure formed by uniting the optical demultiplexer 312 and the optical multiplexer 314 of the eleventh embodiment shown in FIG. 21.

[Fifteenth Embodiment]

Figure 26A:
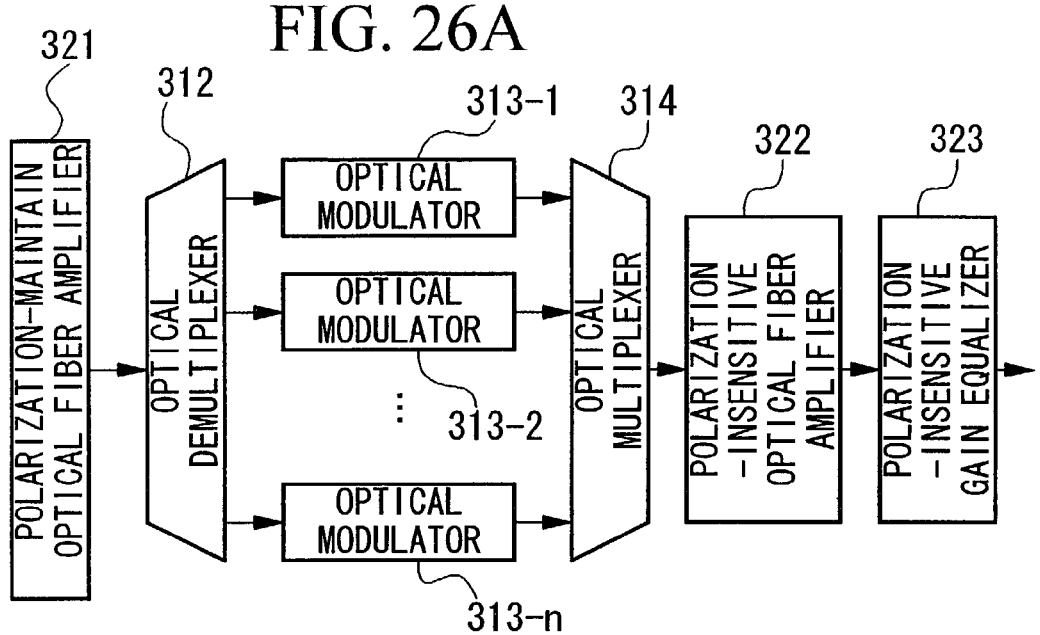
FIGS. 26A and 26B are block diagrams showing the structure of the wavelength-division multiplexed optical signal transmitter according to a fifteenth embodiment of the present invention.
Figure 26B:
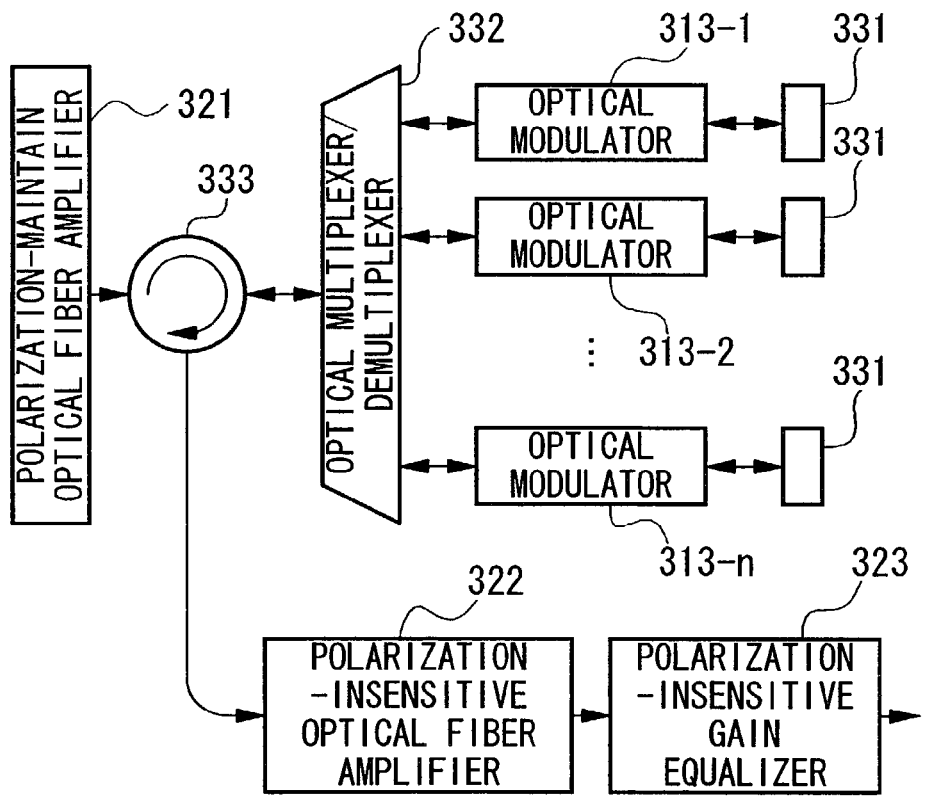

In the fifteenth embodiment, instead of using the multi-wavelength light source 311, as in the eleventh, twelfth, and fourteenth embodiments, spectrum sliced light is used that is obtained by slicing amplified spontaneous emission light (ASE) in the frequency domain using an optical filter. Namely, the multi-wavelength light source 311 shown in FIGS. 21, 23A, 23B, and 25 is removed, the input of the polarization maintain optical fiber amplifier 321 is optically terminated and a generated ASE is used. FIG. 26A corresponds to the eleventh embodiment shown in FIG. 21, while FIG. 26B corresponds to the twelfth embodiment shown in FIG. 23A. In the same way, the structure can also be corresponded to the fourteenth embodiment shown in FIG. 25.

As shown, for example, in FIG. 26A, the optical demultiplexer 312 demultiplexes ASE output from the polarization maintain optical fiber amplifier 321 into spectrum sliced light of narrow bandwidths having different wavelengths. The optical modulators 313-1 to 313-n modulate the corresponding spectrum sliced light of each wavelength, and then the optical multiplexer 314 performs wavelength-division multiplexing on the respective modulated light. The polarization-insensitive optical fiber amplifier 322 amplifies the multiplexed light to a predetermined optical power, and then the polarization-insensitive gain equalizer 323 makes the optical level of each wavelength uniform, and transmits the light along an optical transmission path.

The above described eleventh to fifteenth embodiments use a low cost polarization maintain optical fiber amplifier on the input side of the LN modulators, and provide a polarization-insensitive optical fiber amplifier and a polarization-insensitive gain equalizer on the output side of the LN modulators. Accordingly, the polarization maintain type of gain equalization optical fiber amplifier that is hard to manufacture and is expensive becomes unnecessary. As a result, it is possible to deal with the polarization sensitivity of the LN modulator while making the differences in level between channels uniform at low cost.

Furthermore, by employing a structure in which the optical demultiplexer and the optical demultiplexer are united, and in which the polarization maintain optical fiber amplifier and the polarization-insensitive optical fiber amplifier are united, an even greater lowering in cost can be achieved.

Moreover, in a structure in which the polarization maintain optical fiber amplifier and the polarization-insensitive optical fiber amplifier are united (FIGS. 24A and 24B), because it is sufficient if the polarization-insensitive gain equalizer equalizes the wavelength sensitivity of the polarization maintain optical fiber amplifier the setting of the wavelength characteristics thereof is easy.

[Sixteenth Embodiment]

In the above embodiments, in order to avoid the wavelengths of optical side modes output from different seed lasers being superposed, frequencies in the middle of center frequencies of seed lasers that are adjacent in the frequency domain are not used. The present embodiment also uses such frequencies so as to form continuous frequencies with equal spacing and no gaps, so that the efficiency of frequency utilization is further increased.

Figure 27:
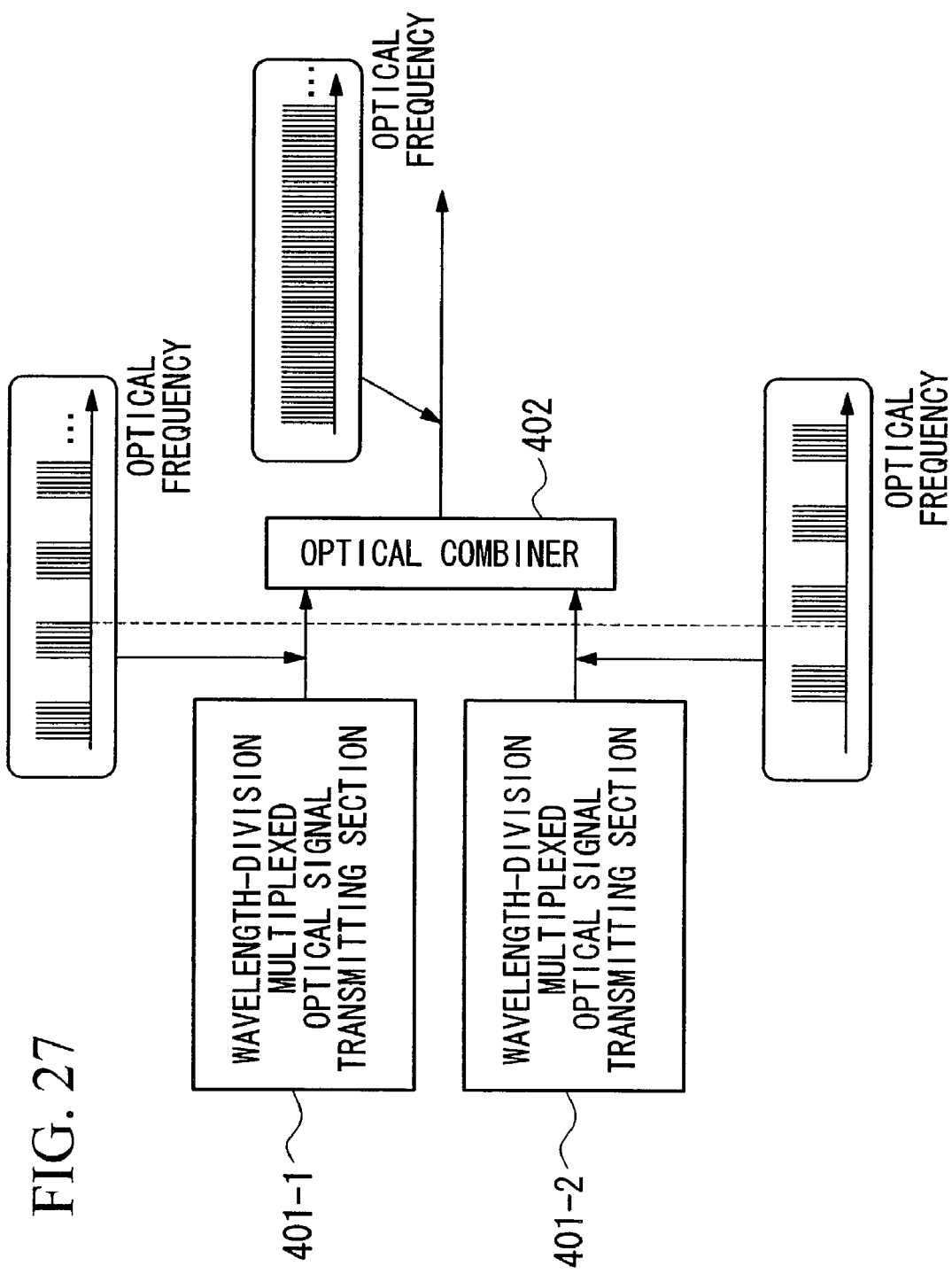
FIG. 27 is a block diagram showing the structure of the wavelength-division multiplexed optical signal transmitter according to a sixteenth embodiment of the present invention.

FIG. 27 is a block diagram showing the structure of the wavelength-division multiplexed optical signal transmitter according to the present embodiment, and is provided with the optical combiner 402 and the wavelength-division multiplexed optical signal transmission sections 401-1 and 401-2 that correspond to the wavelength-division multiplexed optical signal transmitters of each of the above described embodiments. When all of the optical frequencies $f_1, f_2, \ldots f_n \ldots$ are equally spaced, one of the wavelength-division multiplexed optical signal transmission sections 401-1 and 401-2 outputs the optical frequencies $f_1$ to $f_n$, $f_{2n+1}$ to $f_{3n}$, $f_{4n+1}$ to $f_5$, etc., while the other wavelength-division multiplexed optical signal transmission section outputs the optical frequencies $f_{n+1}$ to $f_{2n}$, $f_{3n+1}$ to $f_{4n}$, $f_{5n+1}$ to $f_{6n}$, etc. The optical combiner 402 combines the outputs of the wavelength-division multiplexed optical signal transmission sections 401-1 and 401-2 and transmits the combined output on the transmission path. As a result, as is shown in FIG. 27, light of a uniform frequency is output at equal frequency spacing from the optical combiner 402. Note that the number of wavelength-division multiplexed optical signal transmission sections 401 is not limited to two and it is also possible for three or more to be used.

[Seventeenth Embodiment]

The above described embodiments can be broadly grouped as follows: Embodiments 1 to 4 (referred to below as group 1); Embodiments 5 to 10 (referred to below as group 2); Embodiments 11 to 15 (referred to below as group 3); and Embodiment 16 (referred to below as group 4). It will be clear to a person skilled in the art that it is possible for two, three, or four of these groups to be arbitrarily combined, and an example of such a combination is described below.

Figure 28:
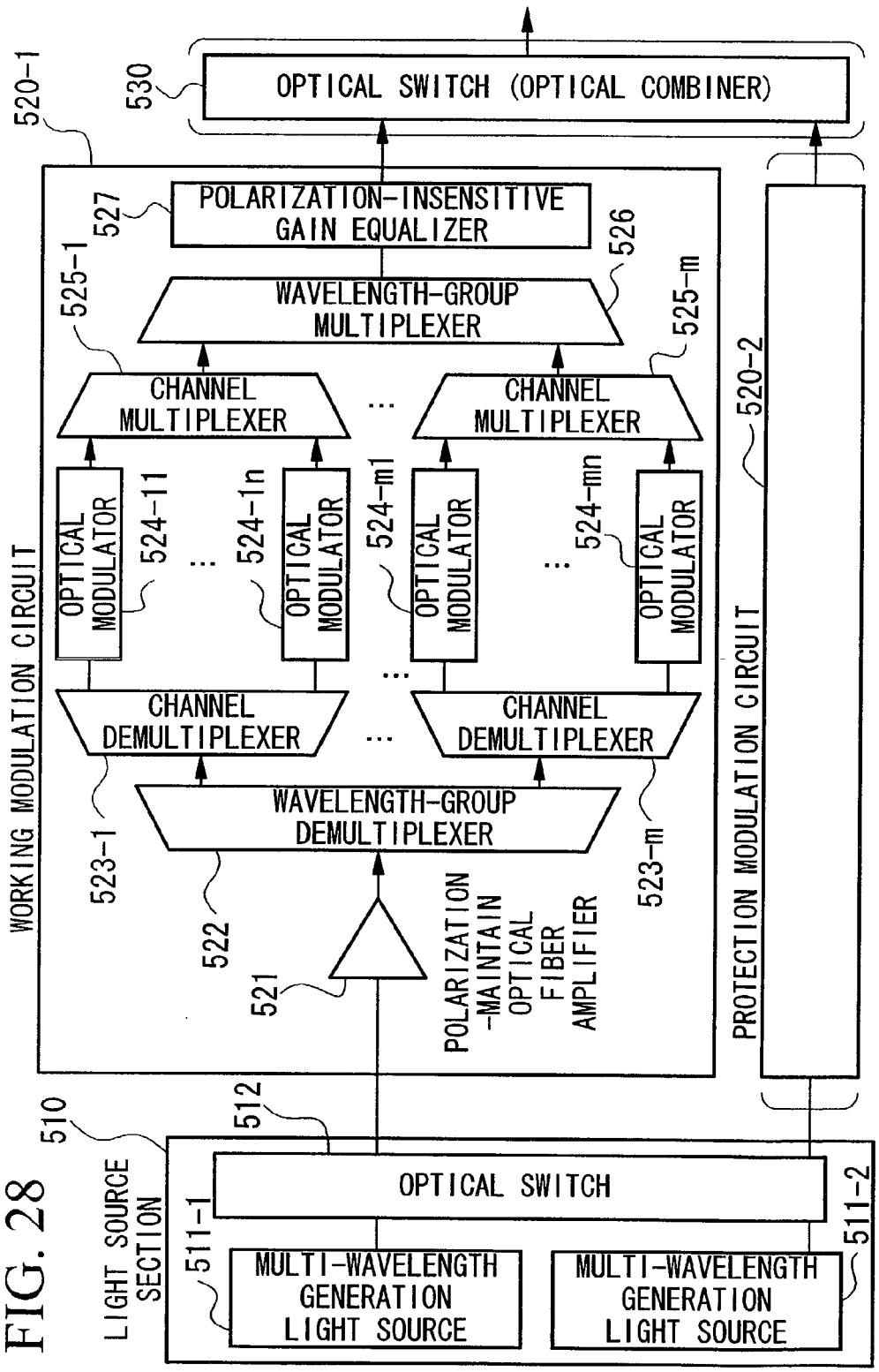
FIG. 28 is a block diagram showing the structure of the wavelength-division multiplexed optical signal transmitter according to a seventeenth embodiment of the present invention.
Figure 29:
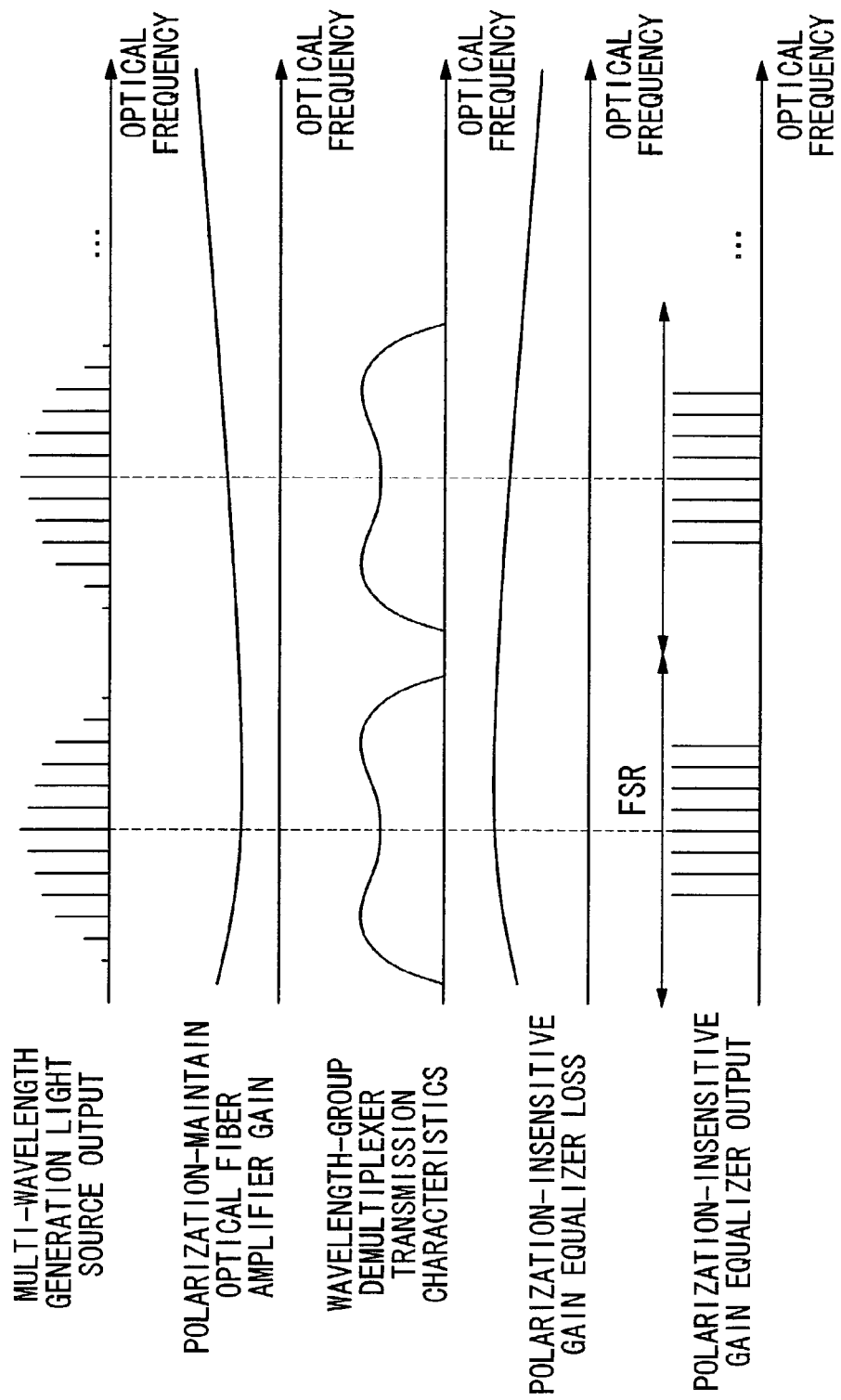
FIG. 29 is a diagram showing optical power deviations at an input into the wavelength-division multiplexed optical signal transmitter and at an output from the wavelength-division multiplexed optical signal transmitter and an optical loss (gain) deviation in the seventeenth embodiment.
Figure 30:
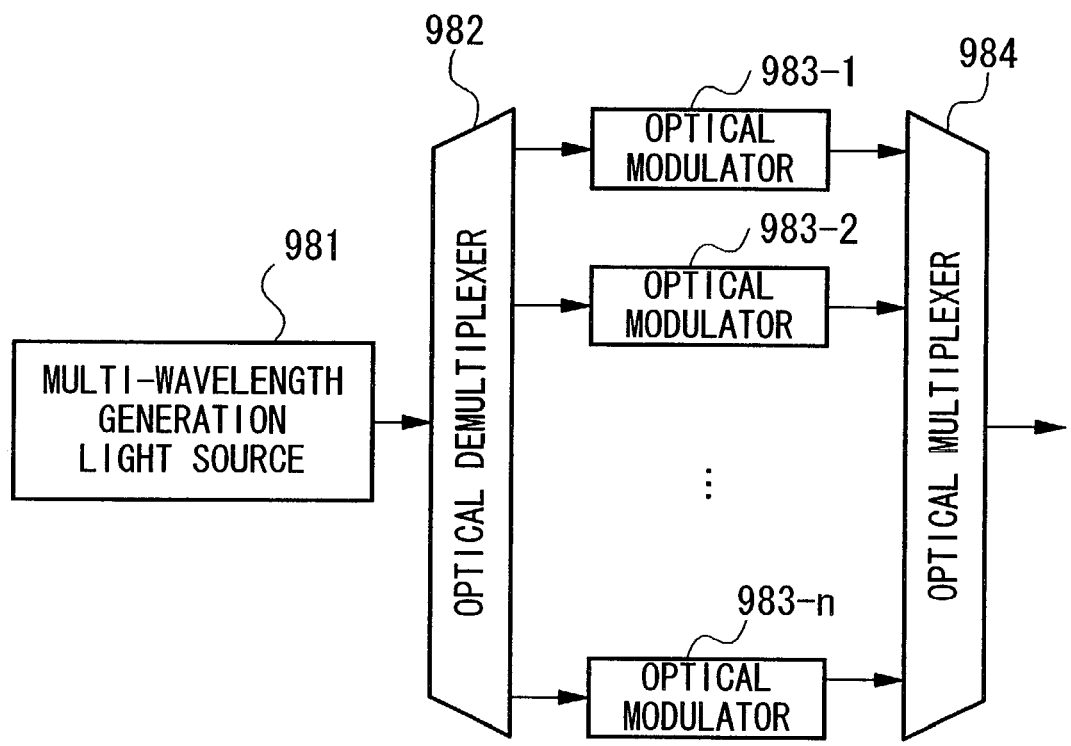
FIG. 30 is a block diagram showing an example of the structure of a conventional wavelength-division multiplexed optical signal transmitter.
Figure 31:
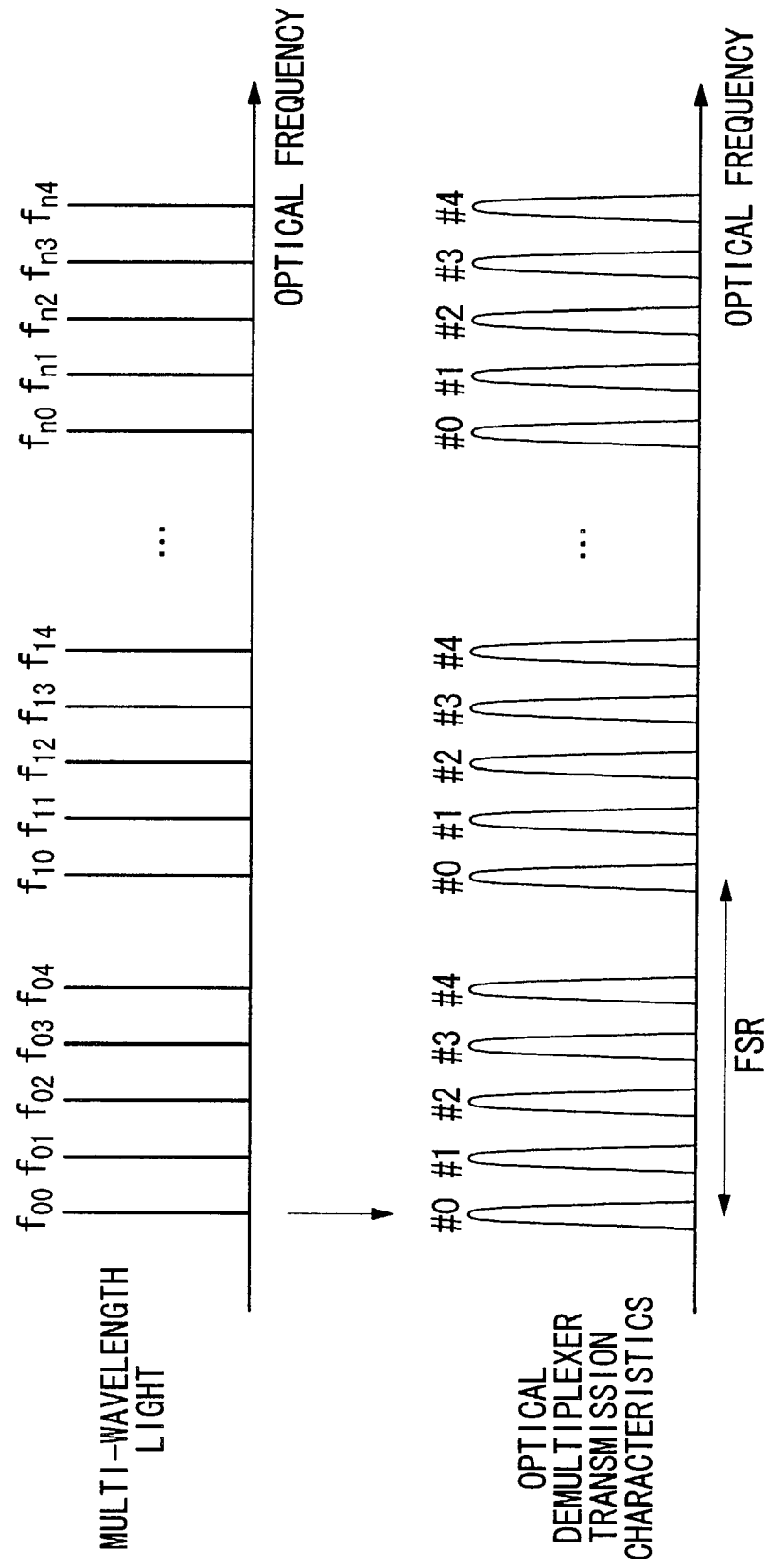
FIG. 31 is a diagram showing transmission characteristics of an optical demultiplexer and an optical spectrum of multi-wavelength light in a conventional circuit.
Figure 32:
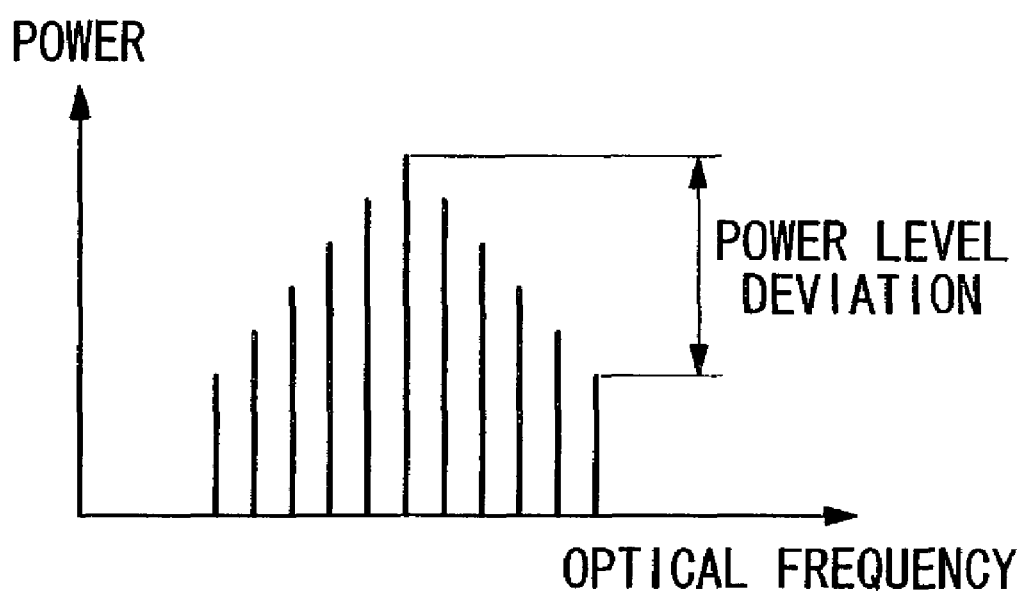
FIG. 32 is a diagram showing an optical spectrum of multi-wavelength light in a conventional circuit.

FIG. 28 is a block diagram showing the structure of a wavelength-division multiplexed optical signal transmitter formed through a combination of groups 1 and 3. FIG. 29 shows the optical loss (gain) deviation relative to the wavelength and the deviation in the optical power level at the input and output of the wavelength-division multiplexed optical signal transmitter. The wavelength-division multiplexed optical signal transmitter shown in FIG. 28 is provided with a light source section 510, multi-wavelength optical modulation circuits 520-1 and 520-2, and a 2×1 optical switch 530.

Because the multi-wavelength optical modulation circuits 520-1 and 520-2 have the same structure, only the structure of the multi-wavelength optical modulation circuit 520-1 is shown in detail. One of the multi-wavelength optical modulation circuits is the working modulation circuit (here, the multi-wavelength optical modulation circuit 520-1), while the other is the protection modulation circuit (here, the multi-wavelength optical modulation circuit 520-2). The protection modulation circuit is not an essential component element and it is not necessary for the protection modulation circuit to be provided. In this case, the optical switch 530 is also unnecessary.

The light source section 510 is provided with the multi-wavelength generation light sources 511-1 and 511-2, as well as the optical switch 512. Any of the multi-wavelength generation light sources described in each of the embodiments above may be used as the multi-wavelength generation light sources 511-1 and 511-2. For example, if the structure shown in FIG. 4 is used, multi-wavelength light is generated simultaneously using a multi-wavelength generation scheme in which the intensity and/or phase of a plurality of seed lasers is modulated. The structure of the optical switch 512 differs depending on whether or not a protection modulation circuit is provided. If no protection modulation circuit is provided (in cases other than the sixth, seventh, ninth, and tenth embodiments), the optical switch 512 is formed by a 2×1 optical switch. If, however, a protection modulation circuit is provided (in the case of the sixth, seventh, ninth, and tenth embodiments), the optical switch 512 is formed by a 2×2 optical switch, and the outputs of the double system are connected respectively to the multi-wavelength optical modulation circuits 520-1 and 520-2

In the same way as in FIG. 1 (the first embodiment), each multi-wavelength optical modulation circuit 520 is provided with a wavelength-group demultiplexer 522, channel demultiplexers 523-1 to 523-m, optical modulators 524-11 to 524-mn, channel multiplexers 525-1 to 525-m, and a wavelength-group multiplexer 526. In addition, in the same way as in FIG. 21 (the eleventh embodiment), each multi-wavelength optical modulation circuit 520 is provided with a polarization maintain optical fiber amplifier 521, whose gain characteristics are not flat, that is positioned upstream from the wavelength-group demultiplexer 522, and a polarization-insensitive gain equalizer 527 positioned downstream from the wavelength-group multiplexer 526. As is shown in FIG. 29, the polarization-insensitive gain equalizer 527 is designed so as to compensate gain deviations of the polarization maintain optical fiber amplifier 521 relative to the wavelength. Note that, the polarization-insensitive optical fiber amplifier 322 shown in FIG. 21 is omitted, however, it is also possible for the polarization-insensitive optical fiber amplifier 322 to be positioned either upstream or downstream from the polarization-insensitive gain equalizer 527.

The transmission center frequency difference between adjacent output ports of the wavelength-group demultiplexer 522 corresponds to the frequency difference between adjacent wavelengths of the light source section 510. Moreover, as is shown in FIG. 29, the transmission center frequency difference between adjacent ports of the wavelength-group demultiplexer 522 is designed to be the same as the frequency spacing of the plurality of seed lasers (corresponding to the reference symbols 11-1 to 11-n shown in FIG. 4) provided in the multi-wavelength generation light source 511. In the same way, the transmission center frequency difference between adjacent ports of the wavelength-group multiplexer 526 is designed to be the same as the frequency spacing of the plurality of seed lasers provided in the multi-wavelength generation light source 511. In addition, the FSR of the channel demultiplexer 523 and the channel multiplexer 525 is designed to be the same as the wavelength spacing of the seed lasers of the multi-wavelength generation light source 511. When an abnormality occurs in the working modulation circuit, the optical switch 530 switches automatically or manually from the working modulation circuit to the protection modulation circuit.

When the sixteenth embodiment (group 4) is further combined with the wavelength-division multiplexed optical signal transmitter shown in FIG. 28, each of the wavelength-division multiplexed optical signal transmission sections 401-1 and 401-2 shown in FIG. 27 is structured so that each section has the same structure as the entire structure shown in FIG. 28. Further, FIG. 28 uses the structures for the wavelength-group multiplexer/demultiplexer and the channel multiplexer/demultiplexer shown in FIG. 1 (the first embodiment) are used, however, it is also possible, for example, for those of the second to fourth embodiments to be used. Moreover, the structure for the polarization maintain optical fiber amplifier used in the eleventh embodiment is used in FIG. 28, however, it is also possible, for example, for those of the twelfth to fifteenth embodiments to be used. Further, a structure of the light source section 510 is described in which an optical switch selects one of a plurality of multi-wavelength generation light sources, however, it is also possible for the structure of each of the above embodiments to be used. Moreover, in FIG. 28, the optical switch 530 is provided because two multi-wavelength optical modulation circuits are used for the working modulation circuit and the protection modulation circuit, however, it is also possible to do away with the optical switch 530 and use a structure in which a plurality of WDM systems are formed, as in the sixth, seventh, ninth, and tenth embodiments.

What is claimed is:

1. A multi-wavelength optical modulation circuit, comprising:
    a wavelength-group demultiplexer that receives multi-wavelength light having a plurality of wavelengths and demultiplexes the multi-wavelength light into wavelength groups formed from the respective plurality of wavelengths;
    a plurality of channel demultiplexers that demultiplex each wavelength group into light of the respective wavelengths;
    a plurality of optical modulators that modulates the light of respective wavelengths demultiplexed by the channel demultiplexers with transmission signals;
    a plurality of channel multiplexers that multiplex the modulated signal light of each wavelength output from the optical modulators for each wavelength group; and
    a wavelength-group multiplexer that multiplexes the wavelength-division multiplexed signal light of each wavelength group output from each channel multiplexer,
    wherein a frequency band of the multi-wavelength light is equal to or greater than free spectral ranges of the channel demultiplexers and the channel multiplexers,
    the wavelength-group demultiplexer and the wavelength-group multiplexer have free spectral ranges equal to or greater than the frequency band of the multi-wavelength light, and
    the channel demultiplexers and the channel multiplexers have free spectral ranges that correspond to a difference in transmission center frequencies between ports of the wavelength-group demultiplexer and the wavelength-group multiplexer where wavelengths are adjacent.

2. The multi-wavelength optical modulation circuit according to claim 1, wherein the multi-wavelength light has an optical spectrum comprising a plurality of wavelength sets distributed in the frequency domain, each wavelength set comprises n (wherein n is an optional natural number) number of wavelengths lined up at a channel frequency spacing of $\Delta f$, a center frequency spacing of two adjacent wavelength sets is $\Delta v$, and a relationship $n \times \Delta f \leq \Delta v$ is established,
    wherein, when output port numbers of the wavelength-group demultiplexer are defined according to transmission frequency sequence, a difference in transmission center frequencies between adjacent output ports of the wavelength-group demultiplexer is a p-fold value (wherein p is an optional natural number) of $\Delta v$,
    and wherein, when input port numbers of the wavelength-group multiplexer are defined according to transmission frequency sequence, a difference in transmission center frequencies between adjacent input ports of the wavelength-group multiplexer is a p-fold value of $\Delta v$.

3. The multi-wavelength optical modulation circuit according to claim 2, wherein transmission center frequencies of the input and output ports of the wavelength-group demultiplexer and the wavelength-group multiplexer match the center frequencies of each of the wavelength sets, and the wavelength-group demultiplexer and the wavelength-group multiplexer perform demultiplexing or multiplexing in units of
    the wavelength sets.

4. The multi-wavelength optical modulation circuit according to claim 3, wherein the multi-wavelength light is formed from the center frequency of each wavelength set and sidebands thereof that are obtained by multiplexing a plurality of blocks of continuous light each of which has a different center frequency and by performing intensity modulation and phase modulation using predetermined cyclic signals.

5. The multi-wavelength optical modulation circuit according to claim 3, wherein the multi-wavelength light is light obtained by multiplexing a plurality of repetitive short optical pulses each of which has a different center frequency.

6. The multi-wavelength optical modulation circuit according to claim 1, wherein the wavelength-group multiplexer and the wavelength-group demultiplexer are formed by a single wavelength-group multiplexer/demultiplexer that performs multiplexing and demultiplexing by transmitting light in opposite directions through a wavelength multiplexer/demultiplexer;
    each of the channel multiplexers and the channel demultiplexers is formed by a single channel multiplexer/demultiplexer that performs multiplexing and demultiplexing by transmitting light in opposite directions through a wavelength multiplexer/demultiplexer; and
    there is further provided an optical input/output device that is disposed upstream from the wavelength-group multiplexer/demultiplexer and that outputs the multi-wavelength light input via a first optical input/output terminal to the wavelength-group multiplexer/demultiplexer via a second optical input/output terminal, and that outputs via a third optical input/output terminal wavelength-division multiplexed signal light input from the wavelength-group multiplexer/demultiplexer via the second optical input/output terminal;
    wherein each of the optical modulators is provided with a fourth optical input/output terminal, an optical modulation element, and a light reflection element, and after the optical modulation element has modulated light of each wavelength input from the channel multiplexer/demultiplexer via the fourth optical input/output terminal, the light reflection element reflects the modulated light to output the reflected light to the channel multiplexer/demultiplexers via the fourth optical input/output terminal;
    and wherein the channel multiplexer/demultiplexer is disposed between the wavelength-group multiplexer/demultiplexer and the optical modulators.

7. The multi-wavelength optical modulation circuit according to claim 1, wherein the optical spectrum of the multi-wavelength light has power level deviations, and at least one of the wavelength-group demultiplexer and the wavelength group multiplexer has transmission characteristics that cancel out the power level deviations in the optical spectrum of the multi-wavelength light.

8. The multi-wavelength optical modulation circuit according to claim 1, wherein the optical spectrum of the multi-wavelength light has power level deviations, and a plurality of semiconductor optical amplifiers that perform adjustments using gain control such that power levels of each wavelength are made uniform are provided either upstream or downstream from the plurality of optical modulators.

9. The multi-wavelength optical modulation circuit according to claim 1, wherein the optical spectrum of the multi-wavelength light has power level deviations, and a plurality of semiconductor optical amplifiers are used as the plurality of optical modulators, and each semiconductor optical amplifier performs control such that power levels of each wavelength are made uniform by adjusting bias current superposed on the transmission signals.

10. The multi-wavelength optical modulation circuit according to claim 1, wherein there is further provided:

a polarization maintain optical fiber amplifier that is disposed upstream from the wavelength-group demultiplexer and that amplifies an optical intensity of the multi-wavelength light while maintaining a polarization of the multi-wavelength light;

a polarization-insensitive optical fiber amplifier that is disposed downstream from the wavelength-group multiplexer and that amplifies an optical intensity of wavelength-division multiplexed modulated light output from the wavelength-group multiplexer independent of the polarization of wavelength-division multiplexed modulated light; and a polarization-insensitive gain equalizer that is disposed downstream from the wavelength-group multiplexer and that makes uniform an optical level of wavelength-division multiplexed modulated light output from the wavelength-group multiplexer or wavelength-division multiplexed modulated light amplified by the polarization-insensitive optical fiber amplifier independent of the polarization of the multiplexed modulated light.

11. The multi-wavelength optical modulation circuit according to claim 1, wherein there are three or more wavelength groups.

12. A wavelength-division multiplexed optical signal transmitter, comprising:

a multi-wavelength generation light source that generates multi-wavelength light having a plurality of wavelengths; and a multi-wavelength optical modulation circuit, wherein the multi-wavelength optical modulation circuit is provided with:

a wavelength-group demultiplexer that receives the multi-wavelength light to demultiplex the multi-wavelength light into wavelength groups formed from the respective plurality of wavelengths;

a plurality of channel demultiplexers that demultiplex each wavelength group into light of the respective wavelengths;

a plurality of optical modulators that modulates the light of each wavelength demultiplexed by the channel demultiplexers with transmission signals;

a plurality of channel multiplexers that multiplex the modulated signal light of each wavelength output from the plurality of optical modulators for each wavelength group; and a wavelength-group multiplexer that multiplexes the wavelength-division multiplexed signal light of each wavelength group output from each channel multiplexer, wherein a frequency band of the multi-wavelength light is equal to or greater than free spectral ranges of the channel demultiplexers and the channel multiplexers, the wavelength-group demultiplexers and the wavelength-group multiplexers have free spectral ranges equal to or greater than the frequency band in which the multi-wavelength light output from the multi-wavelength generation light source is located, and the channel demultiplexers and the channel multiplexers have free spectral ranges that correspond to a difference in transmission center frequencies between ports of the wavelength-group demultiplexer and the wavelength-group multiplexer where wavelengths are adjacent.

13. The wavelength-division multiplexed optical signal transmitter according to claim 12, wherein the multi-wavelength generation light source generates multi-wavelength light having an optical spectrum comprising a plurality of wavelength sets distributed in the frequency domain, each wavelength set comprises n (wherein n is an optional natural number) number of wavelengths lined up at a channel frequency spacing of $\Delta f$, a center frequency spacing of two adjacent wavelength sets is $\Delta v$, and a relationship $n \times \Delta f \leq \Delta v$ is established, wherein, when output port numbers of the wavelength-group demultiplexer are defined according to transmission frequency sequence, a difference in transmission center frequencies between adjacent output ports of the wavelength-group demultiplexer is a p-fold value (wherein p is an optional natural number) of $\Delta v$, and wherein, when input port numbers of the wavelength-group multiplexer are defined according to transmission frequency sequence, a difference in transmission center frequencies between adjacent input ports of the wavelength-group multiplexer is a p-fold value of $\Delta v$.

14. The wavelength-division multiplexed optical signal transmitter according to claim 13, wherein transmission center frequencies of the input and output ports of the wavelength-group demultiplexer and the wavelength-group multiplexer match the center frequencies of each of the wavelength sets, and the wavelength-group demultiplexer and the wavelength-group multiplexer perform demultiplexing or multiplexing in units of the wavelength sets.

15. The wavelength-division multiplexed optical signal transmitter according to claim 14, wherein the multi-wavelength generation light source is provided with:

a light generating section that multiplexes a plurality of blocks of continuous light each of which has a different center frequency to output the multiplexed light; and a multi-wavelength modulating section that performs intensity modulation and phase modulation using predetermined cyclic signals on light output from the light generating section, and generates multi-wavelength light formed from the center frequency of each wavelength set and sidebands thereof.

16. The wavelength-division multiplexed optical signal transmitter according to claim 14, wherein the multi-wavelength generation light source is provided with:
   a plurality of repetitive pulse light sources that output a plurality of repetitive short optical pulses each of which have a different center frequency; and
   a multiplexer that multiplexes the plurality of repetitive short optical pulses.

17. The wavelength-division multiplexed optical signal transmitter according to claim 12, wherein the wavelength-group multiplexer and the wavelength-group demultiplexer are formed by a single wavelength-group multiplexer/demultiplexer that performs multiplexing and demultiplexing by transmitting light in opposite directions through a wavelength multiplexer/demultiplexer;
   each of the channel multiplexers and the channel demultiplexers is formed by a single channel multiplexer/demultiplexer that performs multiplexing and demultiplexing by transmitting light in opposite directions through a wavelength multiplexer/demultiplexer; and
   there is further provided an optical input/output device that is disposed between the multi-wavelength generation light source and the wavelength-group multiplexer/demultiplexer and that outputs the multi-wavelength light input via a first optical input/output terminal to the wavelength-group multiplexer/demultiplexer via a second optical input/output terminal, and that outputs via a third optical input/output terminal wavelength-division multiplexed signal light input from the wavelength-group multiplexer/demultiplexer via the second optical input/output terminal;
   wherein each of the optical modulators is provided with a fourth optical input/output terminal, an optical modulation element, and a light reflection element, and after the optical modulation element has modulated light of each wavelength input from the channel multiplexer/demultiplexer via the fourth optical input/output terminal, the light reflection element reflects the modulated light to output the reflected light to the channel multiplexer/demultiplexers via the fourth optical input/output terminal;
   and wherein the channel multiplexer/demultiplexer is disposed between the wavelength-group multiplexer/demultiplexer and the optical modulators.

18. The wavelength-division multiplexed optical signal transmitter according to claim 12, wherein the optical spectrum of the multi-wavelength light output from the multi-wavelength generation light source has power level deviations, and
   at least one of the wavelength-group demultiplexer and the wavelength group multiplexer has transmission characteristics that cancel out the power level deviations in the optical spectrum of the multi-wavelength light.

19. The wavelength-division multiplexed optical signal transmitter according to claim 12, wherein the optical spectrum of the multi-wavelength light output from the multi-wavelength generation light source has power level deviations, and
   a plurality of semiconductor optical amplifiers that perform adjustments using gain control such that power levels of each wavelength are made uniform are provided either upstream or downstream from the plurality of optical modulators.

20. The wavelength-division multiplexed optical signal transmitter according to claim 12, wherein the optical spectrum of the multi-wavelength light output from the multi-wavelength generation light source has power level deviations, and
   a plurality of semiconductor optical amplifiers are used as the plurality of optical modulators, and each semiconductor optical amplifier performs control such that power levels of each wavelength are made uniform by adjusting bias current superposed on the transmission signals.

21. The wavelength-division multiplexed optical signal transmitter according to claim 12, wherein there is further provided:
   a polarization maintain optical fiber amplifier that is located between the multi-wavelength generation light source and the wavelength-group demultiplexer and that amplifies an optical intensity of the multi-wavelength light while maintaining a polarization of the multi-wavelength light;
   a polarization-insensitive optical fiber amplifier that is located downstream from the wavelength-group multiplexer and that amplifies an optical intensity of wavelength-division multiplexed modulated light output from the wavelength-group multiplexer independent of the polarization of wavelength-division multiplexed modulated light; and
   a polarization-insensitive gain equalizer that is disposed downstream from the wavelength-group multiplexer and that makes uniform an optical level of wavelength-division multiplexed modulated light output from the wavelength-group multiplexer or wavelength-division multiplexed modulated light amplified by the polarization-independent optical fiber amplifier independent of the polarization of the multiplexed modulated light.

22. The wavelength-division multiplexed optical signal transmitter according to claim 12, wherein a plurality of the multi-wavelength generation light sources are provided, and
   each of the multi-wavelength generation light sources is provided with: a light generating section that generates light having one or a plurality of center wavelengths; and a multi-wavelength modulating section that performs intensity modulation and phase modulation using predetermined cyclic signals on light output from the light generating section, and generates multi-wavelength light formed from the center wavelengths and sidebands thereof,
   and wherein there is further provided an optical switch that selects one of the multi-wavelength generation light sources and connects the selected multi-wavelength generation light source to the multi-wavelength optical modulation circuit, and when an abnormality occurs in the selected multi-wavelength generation light source switches to another multi-wavelength generation light source and connects the switched multi-wavelength generation light source to the multi-wavelength optical modulation circuit.

23. The wavelength-division multiplexed optical signal transmitter according to claim 22, wherein a plurality of the multi-wavelength generation light sources are provided,
   and there is further provided a device for branching multi-wavelength light output from a multi-wavelength generation light source selected by the optical switch to supply branched light to the plurality of multi-wavelength optical modulation circuits.

24. The wavelength-division multiplexed optical signal transmitter according to claim 12, wherein the multi-wavelength generation light source is provided with: light generating section that generates light having one or a plurality of center wavelengths; a plurality of multi-wavelength modulating sections that perform intensity modulation or phase modulation using predetermined cyclic signals on output light from the light generating section, and generate multi-wavelength light formed from the center wavelengths and sidebands thereof and a device for branching light output from the light generating section and supplying the branched light to each multi-wavelength modulating section, wherein there is further provided an optical switch that selects one of the multi-wavelength modulating sections and connects the selected multi-wavelength modulating section to the multi-wavelength optical modulation circuit, and when an abnormality occurs in the selected multi-wavelength modulating section switches to another multi-wavelength modulating section and connects the switched multi-wavelength modulating section to the multi-wavelength optical modulation circuit.

25. The wavelength-division multiplexed optical signal transmitter according to claim 24, wherein a plurality of the multi-wavelength optical modulation circuits are provided, and there is further provided a device for branching multi-wavelength light output from a multi-wavelength modulating section selected by the optical switch to supply branched light to the plurality of multi-wavelength optical modulation circuits.

26. The wavelength-division multiplexed optical signal transmitter according to claim 12, wherein the multi-wavelength generation light source is provided with: at least one light generating section that generates light having one or a plurality of center wavelengths; and n (wherein n is a natural number of two or greater) number of multi-wavelength modulating sections that perform intensity modulation or phase modulation using predetermined cyclic signals on output light from at least one of the light generating sections, and generate multi-wavelength light formed from the center wavelengths and sidebands thereof, and a device for branching light output from at least one of the light generating sections and supplying the branched light to each multi-wavelength modulating section, wherein M (wherein M is an integer of two or greater that satisfies M>N) number of the optical modulating sections are provided, and wherein there is provided with an N×M optical switch that connects M number of the multi-wavelength modulating sections one to one with M number of the multi-wavelength optical modulation circuits, and when a fault occurs in any one of the M number of multi-wavelength optical modulating sections switches to one of the (N–M) number of protection multi-wavelength modulating sections and connects the switched protection multi-wavelength modulating section to the corresponding multi-wavelength optical modulation circuit.

27. The wavelength-division multiplexed optical signal transmitter according to claim 12, wherein there are provided a plurality of wavelength-division multiplexed optical signal transmission sections having the multi-wavelength generation light sources and the multi-wavelength optical modulation circuits;

wherein the plurality of wavelength-division multiplexed optical signal transmission sections are formed such that a plurality of wavelengths output by the plurality of wavelength-division multiplexed optical signal transmission sections do not overlap each other but supplement each other;

and wherein there is further provided an optical combiner that combines outputs of the plurality of wavelength-division multiplexed optical signal transmission sections.

28. The wavelength-division multiplexed optical signal transmitter according to claim 12, wherein there are three or more wavelength groups.

29. A multi-wavelength optical modulation circuit, comprising:

a wavelength-group demultiplexer that receives amplified spontaneous emission light and demultiplexes the amplified spontaneous emission light into wavelength groups formed from a respective plurality of wavelengths;

a plurality of channel demultiplexers that demultiplex each wavelength group into light of the respective wavelengths;

a plurality of optical modulators that modulate the light of respective wavelengths demultiplexed by the channel demultiplexers with transmission signals;

a plurality of channel multiplexers that multiplex and modulated signal light of each wavelength output from the optical modulators for each wavelength group; and a wavelength-group multiplexer that multiplexes the wavelength-division multiplexed signal light of each wavelength group output from each channel multiplexer, wherein a frequency band of the amplified spontaneous emission light is equal to or greater than free spectral ranges of the channel demultiplexers and the channel multiplexers, the wavelength-group demultiplexer and the wavelength-group multiplexer have free spectral ranges equal to or greater than the frequency band of the amplified spontaneous emission light, and the channel demultiplexers and the channel multiplexers have free spectral ranges that correspond to a difference in transmission center frequencies between ports of the wavelength-group demultiplexer and the wavelength-group multiplexer where wavelengths are adjacent.

30. A wavelength-division multiplexed optical signal transmitter, comprising:

a polarization maintain optical fiber amplifier input of which is optically terminated and that outputs amplified spontaneous emission light; and a multi-wavelength optical modulation circuit, wherein the multi-wavelength optical modulation circuit is provided with:

a wavelength-group demultiplexer that receives the amplified spontaneous emission light to demultiplex the amplified spontaneous emission light into wavelength groups formed from a respective plurality of wavelengths;

a plurality of channel demultiplexers that demultiplex each wavelength group into light of the respective wavelengths;

a plurality of optical modulators that modulate the light of each wavelength demultiplexed by the channel demultiplexers with transmission signals;

a plurality of channel multiplexers that multiplex the modulated signal light of each wavelength output from the plurality of optical modulators for each wavelength group; and a wavelength-group multiplexer that multiplexes the wavelength-division multiplexed signal light of each wavelength group output from each channel multiplexer, wherein a frequency band of the amplified spontaneous emission light is equal to or greater than free spectral ranges of the channel demultiplexers and the channel multiplexers, the wavelength-group demultiplexers and the wavelength-group multiplexers have free spectral ranges equal to or greater than the frequency band in which the amplified spontaneous emission light output from the polarization maintain optical fiber amplifier is located, and the channel demultiplexers and the channel multiplexers have free spectral ranges that correspond to a difference in transmission center frequencies between ports of the wavelength-group demultiplexer and the wavelength-group multiplexer where wavelengths are adjacent.

31. The multi-wavelength optical modulation circuit according to claim 29, wherein there are three or more wavelength groups.

32. The wavelength-division multiplexed optical signal transmitter according to claim 30, wherein there are three or more wavelength groups.

* * * * *